(12) United States Patent
Kondo

(10) Patent No.: US 10,775,204 B2
(45) Date of Patent: Sep. 15, 2020

(54) ENCODER UNIT, ANGLE MEASURING METHOD, AND ROBOT

(71) Applicant: Seiko Epson Corporation, Tokyo (JP)

(72) Inventor: Takayuki Kondo, Chino (JP)

(73) Assignee: Seiko Epson Corporation (JP)

( * ) Notice: Subject to any disclaimer, the term of this patent is extended or adjusted under 35 U.S.C. 154(b) by 30 days.

(21) Appl. No.: 16/275,658

(22) Filed: Feb. 14, 2019

(65) Prior Publication Data

US 2019/0250014 A1    Aug. 15, 2019

(30) Foreign Application Priority Data

Feb. 15, 2018    (JP) .................................. 2018-025438

(51) Int. Cl.
| | | |
|---|---|---|
| *G01D 5/347* | (2006.01) | |
| *B25J 19/02* | (2006.01) | |
| *G06T 7/60* | (2017.01) | |
| *G06T 7/73* | (2017.01) | |

(52) U.S. Cl.
CPC ........ *G01D 5/34776* (2013.01); *B25J 19/023* (2013.01); *G01D 5/34738* (2013.01); *G06T 7/60* (2013.01); *G06T 7/74* (2017.01); *G06T 2207/30204* (2013.01)

(58) Field of Classification Search
CPC ........... G01D 5/34776; G01D 5/34738; G01D 5/34715; G01D 5/26; G06T 7/60; G06T 7/74; G06T 2207/30204; G01B 11/26; B25J 9/161; B25J 19/023; B25J 13/088
USPC ........................................ 250/231.1–231.18
See application file for complete search history.

(56) References Cited

U.S. PATENT DOCUMENTS

| | | | | |
|---|---|---|---|---|
| 7,378,643 | B2 * | 5/2008 | Lum ................... | G01D 5/34715 250/221 |
| 8,552,362 | B2 * | 10/2013 | Fang ...................... | G01C 22/00 250/231.13 |
| 2017/0274537 | A1 | 9/2017 | Kondo et al. | |
| 2018/0209822 | A1 | 7/2018 | Kondo | |

FOREIGN PATENT DOCUMENTS

| | | |
|---|---|---|
| JP | 2003-097975 A | 4/2003 |
| JP | 2007-178320 A | 7/2007 |
| JP | 2017-177238 A | 10/2017 |
| JP | 2018-120306 A | 8/2018 |

* cited by examiner

*Primary Examiner* — Seung C Sohn
(74) *Attorney, Agent, or Firm* — Harness, Dickey & Pierce, P.L.C.

(57) ABSTRACT

Template matching with an image captured by the first imaging element is performed to obtain a first movement amount in a circumferential direction of the first mark, template matching with an image captured by the second imaging element is performed to obtain a second movement amount in a circumferential direction of the second mark, and a rotation angle is calculated and output by using the first movement amount and the second movement amount.

13 Claims, 17 Drawing Sheets

ENCODER UNIT, ANGLE MEASURING METHOD, AND ROBOT

BACKGROUND

1. Technical Field

The present invention relates to an encoder unit, an angle measuring method, and a robot.

2. Related Art

In the related art, an optical rotary encoder is known as a type of encoder. For example, JP-A-2007-178320 discloses a rotary encoder that includes a dial, a code pattern provided in the vicinity of a peripheral edge of the dial, and a pair of CCD linear sensors that read a code pattern at a symmetrical position. Here, the pair of CCD linear sensors reads the code pattern, obtained read angles are averaged, and thereby an error due to eccentricity of the dial is to be reduced. Further, when an eccentricity factor related to eccentricity of the dial is stored in advance, and a user measures an angle, an angle measurement value is corrected with the eccentricity factor such that an angle error due to the eccentricity with respect to a rotary shaft of the dial is to be eliminated.

A rotary encoder is used for measuring a rotation angle of an output shaft of a speed reducer such as a wave speed reducer. Here, the output shaft of the speed reducer has axial run-out (dynamic eccentricity) with rotation. Therefore, in this case, when, as described in a method disclosed in JP-A-2007-178320, an eccentricity factor obtained in advance in order to eliminate an angle error due to eccentricity is used, a problem arises in that it is not possible to sufficiently reduce an error due to eccentricity of a dial, which is caused by the axial run-out described above, and it is difficult to enhance detection accuracy.

SUMMARY

An encoder unit according to an application example of the invention includes: a speed reducer having an output shaft that rotates around a rotary shaft so as to output a drive force; and an encoder that measures a rotation angle of the output shaft. The encoder includes a rotary unit that moves rotationally around the rotary shaft along with rotational movement of the output shaft, a scale portion that is disposed on the rotary unit in a circumferential direction around the rotary shaft and has a first mark and a second mark, a first imaging element that images the first mark, a second imaging element that is disposed at a position symmetrical with the first imaging element with respect to the rotary shaft and images the second mark, a processor that performs a process of obtaining a rotation angle of the rotary unit based on imaging results imaged by the first imaging element and the second imaging element, and a storage unit that stores an instruction that is readable by the processor. The processor reads the instruction from the storage unit such that template matching with an image captured by the first imaging element is performed to obtain a first movement amount in the circumferential direction of the first mark, template matching with an image captured by the second imaging element is performed to obtain a second movement amount in the circumferential direction of the second mark, and a rotation angle is calculated and output by using the first movement amount and the second movement amount.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an encoder unit, an angle measuring method, and a robot according to the invention will be described in detail on the basis of preferred embodiments illustrated in the accompanying drawings.

1. Robot

Figure 1:
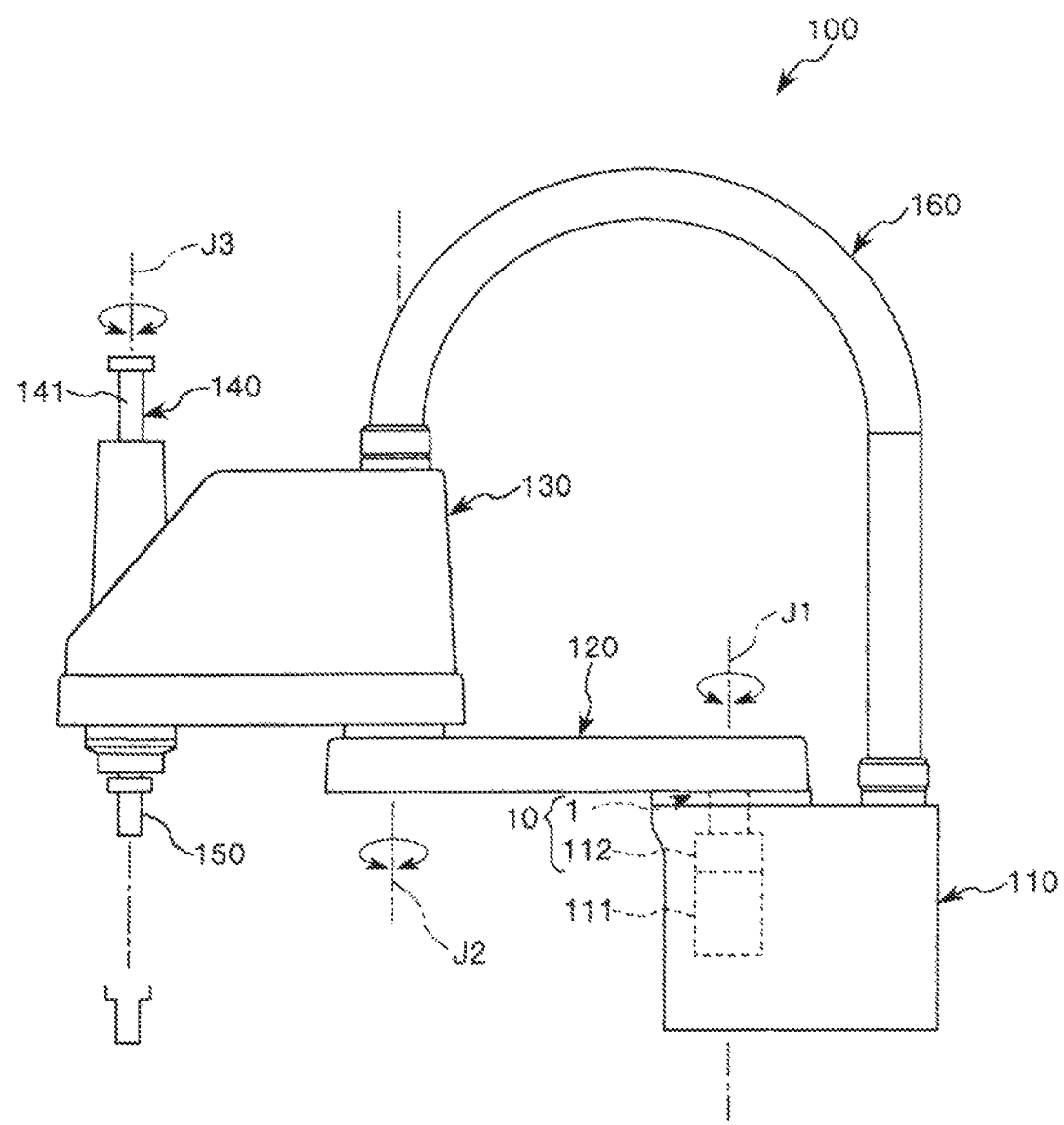
FIG. 1 is a side view illustrating a robot according to an embodiment of the invention.

FIG. 1 is a side view illustrating a robot according to an embodiment of the invention. Hereinafter, for convenience of description, in FIG. 1, an upper side is referred to as "above", and a lower side is referred to as "below". In addition, in FIG. 1, a base side is referred to as a "proximal end side", and an opposite side (end effector side) thereof is referred to as a "distal end side". In addition, in FIG. 1, an up-down direction is referred to as a "vertical direction", and a right-left direction is referred to as a "horizontal direction".

A robot 100 illustrated in FIG. 1 is a so-called horizontal articulated robot (SCARA robot), can be used in a manufacturing process or the like of manufacturing precision measuring equipment, and can perform gripping, transporting, or the like of the precision measuring equipment, a component, or the like.

As illustrated in FIG. 1, the robot 100 includes a base 110, a first arm 120, a second arm 130, a work head 140, an end effector 150, and a wiring lay-out unit 160. Hereinafter, portions of the robot 100 will be briefly described in order.

The base 110 is fixed to a floor (not illustrated) with a bolt, or the like. The first arm 120 is connected to a top portion of the base 110. The first arm 120 is rotationally movable around a first axis J1 in the vertical direction with respect to the base 110.

Inside the base 110, a motor 111 which is a first motor that generates a drive force for causing the first arm 120 to move rotationally and a speed reducer 112 which is a first speed reducer that reduces a speed of the drive force of the motor 111 are provided. An input shaft of the speed reducer 112 is connected to a rotary shaft of the motor 111, and an output shaft of the speed reducer 112 is connected to the first arm 120. Therefore, when the motor 111 is driven, and the drive force of the motor is transmitted to the first arm 120 via the speed reducer 112, the first arm 120 moves rotationally in a horizontal plane around the first axis J1 with respect to the base 110.

In addition, an encoder 1 is provided in the base 110 and the first arm 120, the encoder being a first encoder that measures a rotation angle of the output shaft of the speed reducer 112, thereby, detecting a rotation state of the first arm 120 with respect to the base 110. Here, the encoder 1 and the speed reducer 112 configure an encoder unit 10.

The second arm 130 is connected to a distal portion of the first arm 120. The second arm 130 is rotationally movable around a second axis J2 in the vertical direction with respect to the first arm 120. Although not illustrated, inside the second arm 130, a second motor that generates a drive force for causing the second arm 130 to move rotationally and a second speed reducer that reduces a speed of the drive force of the second motor are provided. The drive force of the second motor is transmitted to the first arm 120 via the second speed reducer, and thereby the second arm 130 moves rotationally in the horizontal plane around the second axis J2 with respect to the first arm 120. In addition, although not illustrated, a second encoder is provided in the second motor and detects a rotation state of the second arm 130 with respect to the first arm 120.

The work head 140 is disposed at a distal portion of the second arm 130. The work head 140 has a spline shaft 141 that penetrates a spline nut and a ball screw nut (both not illustrated) which are disposed coaxially at the distal portion of the second arm 130. The spline shaft 141 is rotationally movable around an axis of the spline shaft and is movable (liftable and lowerable) in the up-down direction with respect to the second arm 130.

Although not illustrated, a rotation motor and a lifting/lowering motor are disposed inside the second arm 130. When the drive force of the rotation motor is transmitted to the spline nut by a drive force transmitting mechanism not illustrated, and the spline nut rotates forward and reverse, the spline shaft 141 rotates forward and reverse around an axis J3 in the vertical direction. In addition, although not illustrated, a third encoder is provided in the rotation motor and detects a rotation state of the spline shaft 141 with respect to the second arm 130.

On the other hand, when a drive force of the lifting/lowering motor is transmitted to the ball screw nut by a drive force transmitting mechanism not illustrated, and the ball screw nut rotates forward and reverse, the spline shaft 141 moves upward and downward. A fourth encoder is provided in the lifting/lowering motor and measures a movement amount of the spline shaft 141 with respect to the second arm 130.

The end effector 150 is connected to a distal portion (bottom portion) of the spline shaft 141. The end effector 150 is not particularly limited, and examples thereof include a unit that grips an object to be transported, and a unit that performs work on a workpiece.

A plurality of wirings that are connected to electronic components (for example, the second motor, the rotation motor, the lifting/lowering motor, the first to fourth encoders, or the like) disposed in the second arm 130 are laid out to the inside of the base 110 through the pipe-shaped wiring lay-out unit 160 that connects the second arm 130 and the base 110. Further, the plurality of wirings are integrated inside the base 110, thereby, together with a wiring that is connected to the motor 111 and the encoder 1, being laid out to a control device (not illustrated) that is disposed outside the base 110 and controls the robot 100 collectively.

As described above, a configuration of the robot 100 is briefly described. As described above, the robot 100 includes the base 110, which is a first member, the first arm 120, which is a second member that moves rotationally with respect to the base 110, and the encoder unit 10. Here, the encoder unit 10 includes the speed reducer 112 that has an output shaft which rotates around a rotary shaft so as to output a drive force and the encoder 1 that measures the rotation angle of the output shaft of the speed reducer 112. The speed reducer 112 is installed in the base 110 such that the output shaft of the speed reducer 112 is connected to the first arm 120. According to the robot 100, as will be described below, it is possible to measure the rotation angle of the first arm 120 with high accuracy and to perform drive control of the first arm 120 with high accuracy based on a detection result thereof.

Here, a rotary unit of the encoder 1 to be described below is the first arm 120 (second member). Consequently, it is possible to reduce the number of components.

2. Encoder Unit

First Embodiment

Hereinafter, the encoder unit 10 will be described in detail. Hereinafter, a case where the encoder unit 10 is installed in the robot 100 will be described as an example.

Figure 2:
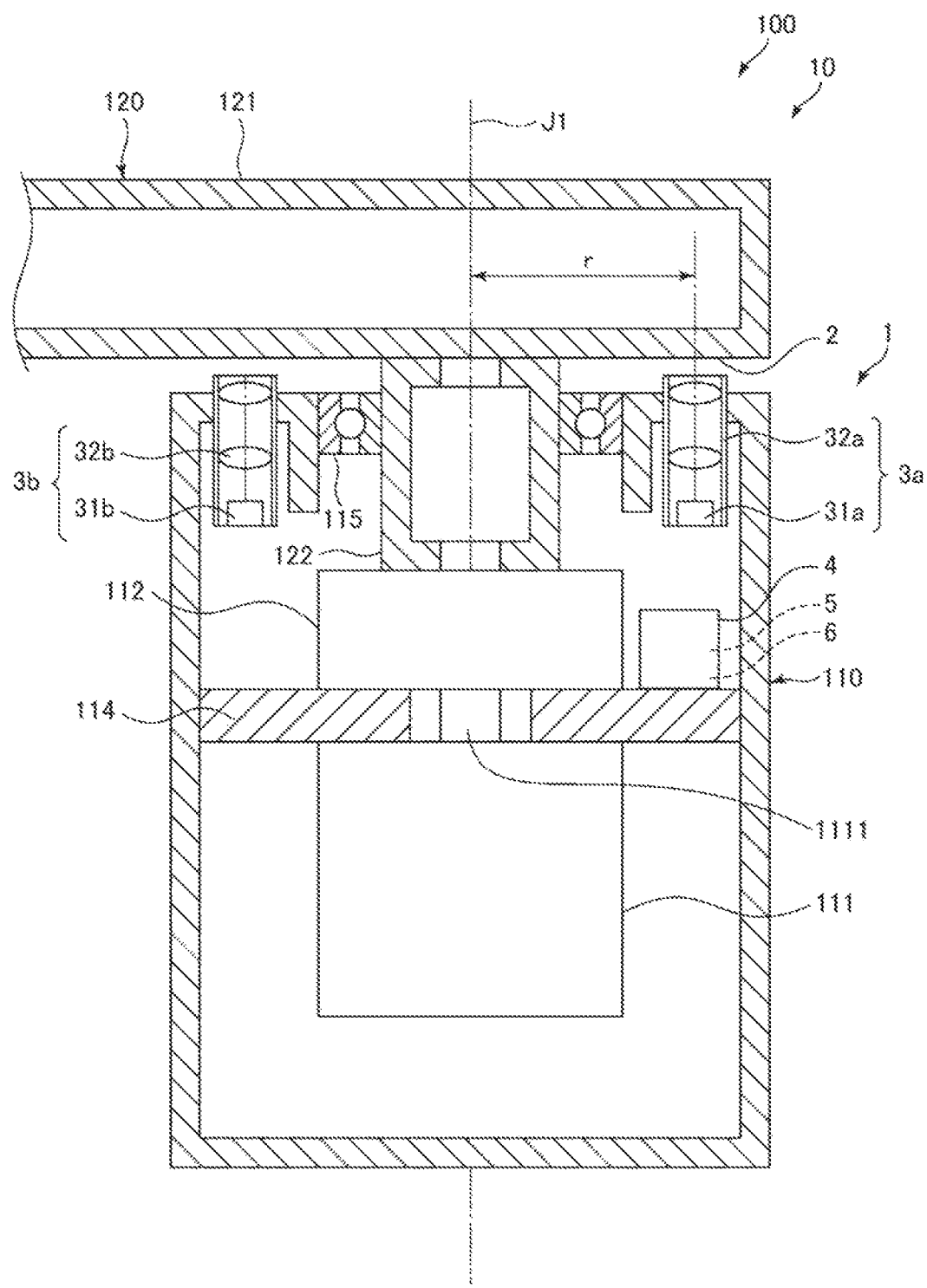
FIG. 2 is a sectional view illustrating an encoder unit according to a first embodiment of the invention.
Figure 3:
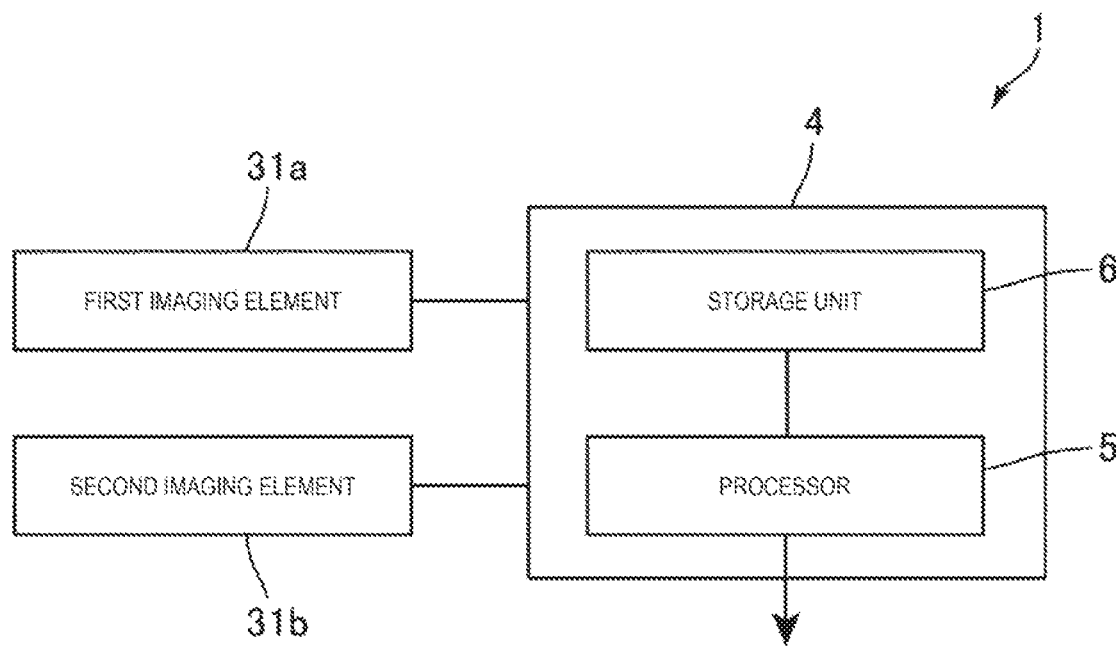
FIG. 3 is a block diagram illustrating an encoder of the encoder unit.
Figure 4:
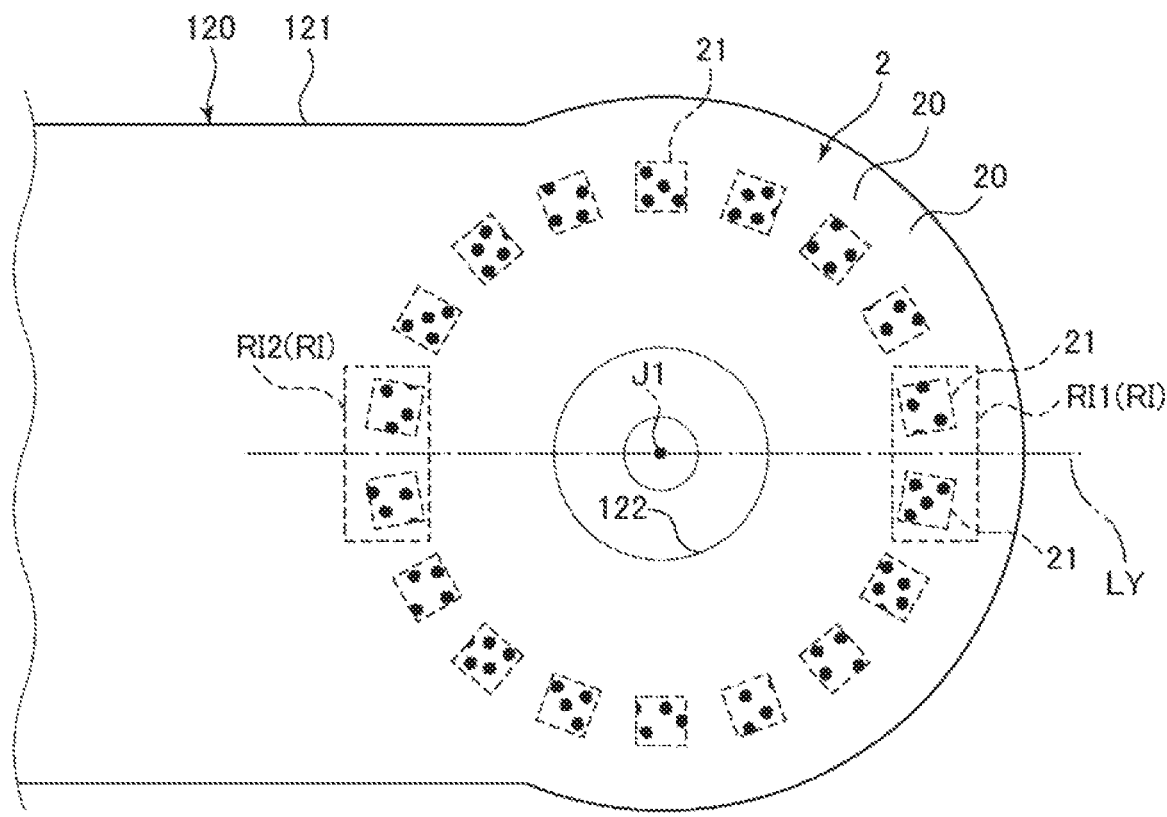
FIG. 4 is a view for illustrating a scale portion included in the encoder of the encoder unit.

FIG. 2 is a sectional view illustrating the encoder unit according to a first embodiment of the invention. FIG. 3 is a block diagram illustrating the encoder of the encoder unit. FIG. 4 is a view for illustrating a scale portion included in the encoder of the encoder unit. In addition, in the drawings, for convenience of description, a scale of portions is appropriately changed, a scale in a configuration illustrated in the drawings is not necessarily equal to an actual scale, or portions are appropriately omitted in the drawing.

As illustrated in FIG. 2, the base 110 of the robot 100 described above includes a support member 114 that supports the motor 111 and the speed reducer 112 and houses the motor 111 and the speed reducer 112. The first arm 120 is provided on the base 110 so as to be rotationally movable around the first axis J1.

The first arm 120 includes an arm main body portion 121 that extends in the horizontal direction and a shaft portion 122 that projects downward from the arm main body portion 121, the arm main body portion and the shaft portion being connected to each other. The shaft portion 122 is supported on the base 110 via a bearing 115 so as to be rotationally movable around the first axis J1 and is connected to the output shaft of the speed reducer 112. In addition, the input shaft of the speed reducer 112 is connected to a rotary shaft 1111 of the motor 111. The speed reducer 112 is not particularly limited, and examples thereof include a wave speed reducer, a planetary gear speed reducer, a cyclo-speed reducer, an RV speed reducer, or the like.

Here, the base 110 is a structure to which a load due to own weight of the base 110 or a mass of another member supported by the base 110 is applied. Similarly, the first arm 120 is a structure to which a load due to own weight of the first arm 120 or a mass of another member supported by the first arm 120 is applied. A configurational material of the base 110 and the first arm 120 is not particularly limited, and an example thereof includes a metal material.

In the embodiment, outer surfaces of the base 110 and the first arm 120 configure a part of an outer surface of the robot 100. An exterior member such as a cover or an impact absorbing member may be installed on the outer surfaces of the base 110 and the first arm 120.

In the base 110 and the first arm 120 which relatively move rotationally with respect to each other, the encoder 1 that detects rotation states thereof is provided therein.

The encoder 1 includes a scale portion 2 that is provided on the first arm 120, a first detector 3a and a second detector 3b that are provided on the base 110 so as to detect the scale portion 2, and a circuit section 4 that is electrically connected to the first detector 3a and the second detector 3b. Here, the circuit section 4 includes a processor 5 and a storage unit 6.

As illustrated in FIG. 2, the scale portion 2 is provided in a region that is opposite to the base 110 of the arm main body portion 121, that is, a region that is on an underside of the arm main body portion 121 and surrounds the shaft portion 122. As illustrated in FIG. 4, the scale portion 2 has an irregular pattern that is disposed around the first axis J1 at a position different from the first axis J1. Here, the scale portion 2 is provided on a surface of the first arm 120. Consequently, there is no need to provide a member for providing the scale portion 2 thereon separately from the base 110 and the first arm 120. Therefore, it is possible to reduce the number of components. The scale portion 2 is not limited to being provided right on the surface of the first arm 120, and may be provided on a sheet-shaped member adhered to the surface of the first arm 120 or may be provided on a plate-shaped member provided to move rotationally along with the first arm 120. In other words, the member, on which the scale portion 2 is provided, may be a member that moves rotationally around the first axis J1 along with the first arm 120 with respect to the base 110. Accordingly, the member, on which the scale portion 2 is provided in the encoder 1, can be referred to as a rotary unit. In addition, the second member described above is the first arm 120, and thus the rotary unit is the first arm 120.

As illustrated in FIG. 4, the scale portion 2 (irregular pattern) has a configuration in which a plurality of dots 20 (designs) are irregularly disposed. Here, "the irregular pattern" means that two or more patterns do not appear to be the same as each other (patterns that are not identifiable by the processor 5) in a size corresponding to a reference image TA to be described below in a predetermined region (for example, an effective visual field region RU or a search region RS to be described below) in a captured image G, when the scale portion 2 is caused to move rotationally over an angle range (in the embodiment, an angle range in which the first arm 120 is rotatable with respect to the base 110) around the first axis J1. Therefore, each of a plurality of parts of the scale portion 2, which are disposed at different positions from each other, can be used as a mark 21 for position identification in a circumferential direction of the scape portion. In this manner, the scale portion 2 can be considered to have a plurality of marks 21 which are different from each other such that different positions are identifiable from each other in the circumferential direction thereof. FIG. 4 illustrates a case where the plurality of marks 21 are arranged along a circumference with the first axis J1 as the center. In addition, positions, a size, the number, or the like of the marks 21 illustrated in FIG. 4 are an example and are not limited. In addition, contrary to FIG. 2, the scale portion 2 may be disposed on the base 110, and the detectors 3a and 3b may be disposed on the side of the arm 120.

It is preferable that the scale portion 2 (pattern) has a configuration in which unique pattern designs different from each other are designed into print drawing. In the example, dot-shaped black dots are disposed on a white background so as to form unique patterns.

In addition, since the patterns of the scale portion 2 are continually disposed around the first axis J1, constraints of positions in a rotational movement direction (circumferential direction) are reduced, and a degree of freedom increases, when the processor 5 generates a reference image (template) as will be described below. In addition, the patterns of the scale portion 2 are disposed even outside the effective visual field region RU in a Y-axis direction of the captured image G. Therefore, even when positioning of the scale portion 2 (pattern) with respect to the first arm 120 is not performed with high accuracy, it is possible to generate the reference image (template), and it is possible to estimate a corresponding rotation state.

The scale portion 2 may have a gradual change in shades in the circumferential direction. In other words, density (disposition density) of the plurality of dots 20 may change around the first axis J1 (rotary shaft). In addition, a color of the dots 20 (design) of the scale portion 2 is not particularly limited, and may be any color; however, it is preferable that the color is different from a color of part other than the dots 20 of the scale portion 2, and it is preferable to use black or a dark color. Consequently, it is possible to increase contrast of the captured images acquired by a first imaging element 31a and a second imaging element 31b to be described below.

In addition, a shape of the dots 20 (designs) of the scale portion 2 is a circle; but the shape is not limited thereto, and an ellipse, a quadrangle, an abnormal shape, or the like may be employed, for example. In addition, the patterns of the scale portion 2 are not limited to dot patterns (repetition of design) like the patterns configured of the plurality of dots 20 described above, and examples of the pattern may include a pattern configured of straight lines, a pattern configured of curves, a pattern configured of a combination of at least two types of dots, straight lines, and curves, a reverse pattern thereof, or the like.

Further, as long as the pattern can be captured by the first imaging element 31a and the second imaging element 31b to be described below, the pattern of the scale portion 2 is not limited to the pattern formed with ink of dye, a pigment, or the like by using a printing device described above, and a pattern having an uneven shape, a pattern that is formed with natural objects, or the like may be employed. Examples of patterns having the uneven shape include an uneven pattern due to roughness or irregularity of a processed surface through etching, cutting, shot blast, sand blast, rasping, or the like, an uneven pattern due to fibers on a surface of paper, fabric (nonwoven fabric or woven fabric), or the like, an uneven pattern of a coated surface, or the like. In addition, an example of a pattern formed with a natural object includes a pattern with grains, or the like. In addition, when a coated film is formed with a transparent coating material mixed with black beads, it is possible to obtain coating film on which a plurality of black beads are irregularly disposed, and the plurality of beads of the coated film may be used in the scale portion 2 as the irregular pattern.

In addition, the marks 21 of the scale portion 2 are not limited to a design using the irregular pattern, and numbers may be used, characters such as Roman letters, Arabic letters, or Chinese characters may be used, or symbols, codes, emblems, a design, one-dimensional bar codes, QR codes (registered trademark), or the like may be used.

The first detector 3a (first camera) illustrated in FIG. 2 includes the first imaging element 31a, which is provided in the base 110, and a first optical system 32a, which is provided in an opening of the base 110, and the first imaging element 31a images a part of the scale portion 2 in the circumferential direction (an imaging region RI1 on the right side in FIG. 4) via the first optical system 32a. A light source that irradiates the imaging region RI1 of the first imaging element 31a may be provided, as necessary.

Examples of the first imaging element 31a include a charge coupled device (CCD), a complementary metal oxide semiconductor (CMOS), or the like. The first imaging element 31a converts a captured image into an electric signal for each pixel and outputs the electric signal. The first imaging element 31a is applicable to both a two-dimensional imaging element (area image sensor) and a one-dimensional imaging element (line image sensor). It is desirable that the one-dimensional imaging element has a configuration in which pixels are arranged in a contact direction with a turning circle of the arm. In a case of using the two-dimensional imaging element, it is possible to acquire a two-dimensional image including a large amount of information, and it is easy to enhance detection accuracy of the mark 21 through template matching to be described below. As a result, it is possible to detect the rotation state of the first arm 120. In a case of using the one-dimensional imaging element, an image acquisition cycle, that is, a frame rate, increases. Therefore, it is possible to increase detection frequency, and thus the element is advantageous during a high speed movement.

The first optical system 32a is an image forming optical system that is disposed between the scale portion 2 and the first imaging element 31a. It is preferable that the first optical system 32a is telecentric at least on a side of an object (side of the scale portion 2).

Consequently, even when a distance between the scale portion 2 and the first imaging element 31a changes, it is possible to decrease a change in imaging magnification to the first imaging element 31a and, as a result, it is possible to decrease degradation of the detection accuracy of the encoder 1. In particular, in a case where the first optical system 32a is telecentric on both sides, it is possible to decrease the change in imaging magnification to the first imaging element 31a, even when a distance between a lens included in the first optical system 32a and the first imaging element 31a changes. Therefore, it is advantageous to easily assemble the first optical system 32a.

Here, as illustrated in FIG. 4, the imaging region RI1 of the first imaging element 31a is provided on the underside of the first arm 120 so as to overlap a part of the scale portion 2 in the circumferential direction. Consequently, the first imaging element 31a is capable of imaging the mark 21 in the imaging region RI1. Hence, the mark 21 positioned in the imaging region RI1 is read, and thereby it is possible to know the rotation state of the first arm 120.

On the other hand, the second detector 3b (second camera) is disposed at a position symmetrical with the first detector 3a with respect to the first axis J1. The second detector 3b is configured in a similar way to the first detector 3a. In other words, the second detector 3b includes the second imaging element 31b, which is provided in the base 110, and a second optical system 32b, which is provided in an opening of the base 110, and the second imaging element 31b images a part of the scale portion 2 in the circumferential direction (an imaging region RI2 on the left side in FIG. 4) via the second optical system 32b.

Here, it is preferable that the second imaging element 31b images the scale portion 2 in the same resolution as that of the first imaging element 31a. Consequently, when the rotation angle is calculated by using a first movement amount and a second movement amount to be described below, calculation thereof is simplified. From such a viewpoint, it is preferable that the second imaging element 31b has the same size and the same number of pixels as those of the first imaging element 31a, and it is preferable that the second optical system 32b has the same magnification as that of the first optical system 32a.

The circuit section 4 illustrated in FIGS. 2 and 3 includes the processor 5 such as a central processing unit (CPU), and a storage unit 6 (memory) such as a read only memory (ROM) or a random access memory (RAM). Here, the storage unit 6 stores an instruction that is readable by the processor 5. Thus, the processor 5 appropriately reads and executes the instruction from the storage unit 6, thereby, realizing various functions. For example, the circuit section 4 can be configured by using an application specific integrated circuit (ASIC) or a field-programmable gate array (FPGA). In this manner, the circuit section 4 becomes hardware by using the ASIC or the FPGA, and thereby it is possible to achieve a high processing speed and a reduction in size and cost of the circuit section 4. At least a part of the circuit section 4 may be installed in the control device of the robot 100 described above.

The processor 5 estimates relative rotation states of the base 110 and the first arm 120 based on detection results of the first detector 3a and the second detector 3b. Examples of the rotation state include a rotation angle, a rotation speed, a rotation direction, or the like.

In particular, the processor 5 performs template matching with captured images (captured image data) the first imaging element 31a and the second imaging element 31b by using the reference image (reference image data), thereby performing image recognition of the mark 21, and estimates relative rotation states of the base 110 and the first arm 120 by using a recognition result thereof. In this manner, the processor estimates the rotation states by using both of the captured images acquired by the first imaging element 31a and the second imaging element 31b, and thereby it is possible to decrease detection errors due to axial run-out (eccentricity) depending on rotation of the output shaft of the speed reducer 112, and it is possible to more enhance the detection accuracy, compared with a case of estimating the rotation states by using any captured image acquired by the first imaging element 31a or the second imaging element 31b. This will be described below in detail.

Here, the processor 5 is configured to be capable of more finely estimating the relative rotation angles of the base 110 and the first arm 120 (hereinafter, simply referred to as "the rotation angle of the first arm 120") based on a position of the image of the mark 21 in the captured image acquired by the first imaging element 31a and the second imaging element 31b. In addition, the processor 5 is configured to be capable of obtaining the rotation speed based on a time interval between detection of the mark 21 or estimating the rotation direction based on an order of types of marks 21 that are detected. The processor 5 outputs a signal depending on an estimation result described above, that is, a signal depending on the rotation states of the base 110 and the first arm 120. For example, the signal is input to the control device (not illustrated) and is used in control of movement of the robot 100.

In addition, the processor 5 has a function of cutting a part of the captured image acquired by the first imaging element 31a and the second imaging element 31b so as to generate a reference image (template). The reference image is generated before the relative rotation states of the base 110 and the first arm 120 are estimated, at a right time as necessary, or for each relative rotation angle of the base 110 and the first arm 120. The generated reference image is stored in the storage unit 6, in association with each relative rotation angle of the base 110 and the first arm 120. The processor 5 performs the template matching by using the reference image (template) that is stored in the storage unit 6. The template matching and the estimation of the rotation state using thereof will be described below in detail.

The storage unit 6 stores various items of information (data) that is readable by the processor 5, in addition to the instruction (program) readable by the processor 5. Specifically, the storage unit 6 stores the reference image described above (reference image data) together with information on a coordinate (coordinate of the reference pixel to be described below) in the captured image corresponding to the reference image, and image on the rotation angle of the first arm 120 (angle information), for each relative rotation state of the base 110 and the first arm 120. The storage unit 6 may be a non-volatile memory or a volatile memory; however, the non-volatile memory is preferable, from a viewpoint of being capable of maintaining a state of storing information even when power is not supplied, and it is possible to achieve power saving.

Template Matching and Estimation of Rotation State by Using Template Matching

Hereinafter, the template matching and the estimation of the rotation state by using the template matching in the processor 5 will be described below in detail. Hereinafter, first, a case of estimating a rotation angle as the rotation state by using any captured image acquired by either the first imaging element 31a or the second imaging element 31b will be representatively described. A case of estimating a rotation angle as the rotation state by using both of the captured images acquired by the first imaging element 31a and the second imaging element 31b will be described below.

Acquisition of Reference Image

In the encoder 1, before the rotation state of the first arm 120 with respect to the base 110 is estimated by using the template matching, the reference image is acquired by using the template matching. The acquisition of the reference image may be performed only once before the first template matching; however, the acquisition may be performed appropriately as necessary thereafter. In this case, it is possible to update the reference image acquired by using the template matching to a newly acquired reference image.

When the reference image is acquired, the first arm 120 is caused to move rotationally around the first axis J1 with respect to the base 110, and the first imaging element 31a and the second imaging element 31b image the plurality of marks 21 for each mark 21. The acquired captured images are trimmed, and thereby a reference image for each mark 21 is generated. The generated reference image is stored together with image coordinate information and angle information thereof in the storage unit 6, in association with the information. Hereinafter, this will be described below in detail with reference to FIG. 5.

Figure 5:
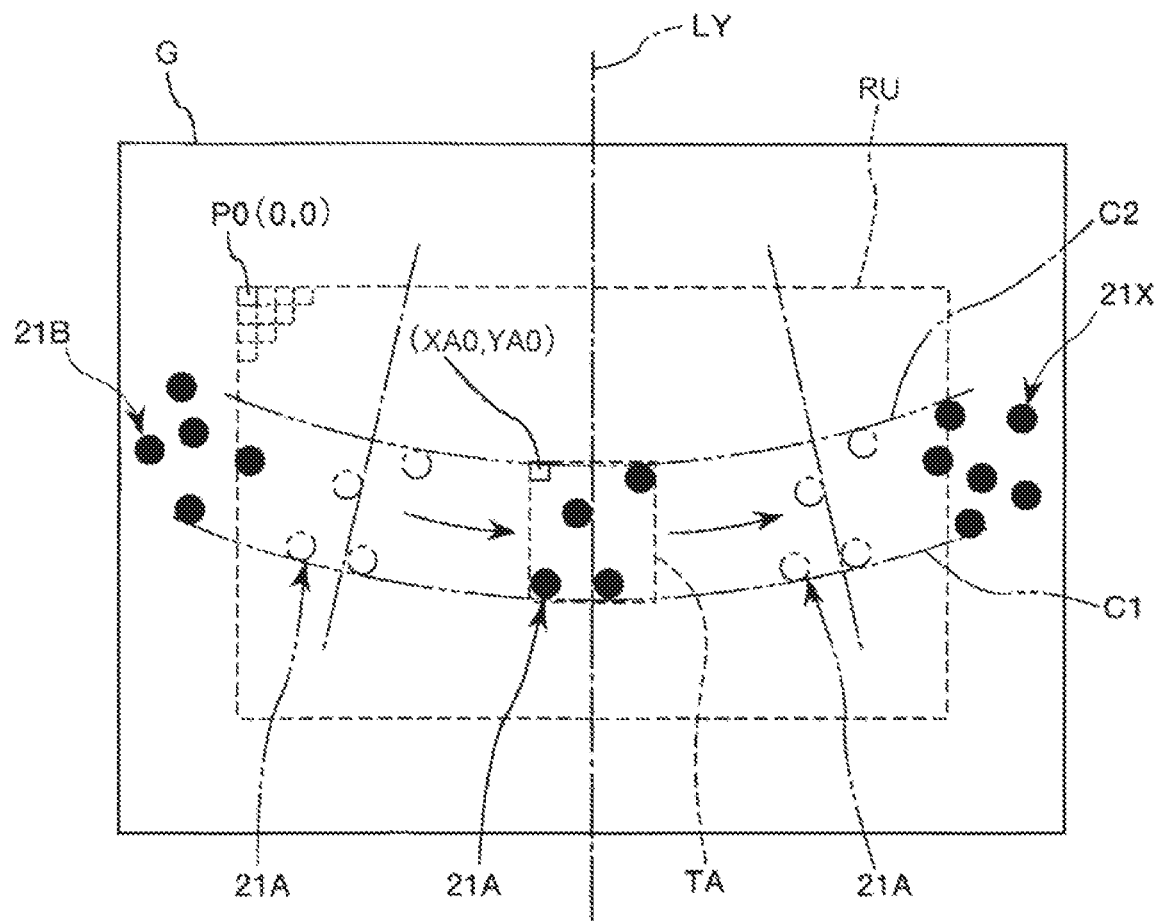
FIG. 5 is a view for illustrating an image captured by a first imaging element or a second imaging element included in the encoder.

FIG. 5 is a view for illustrating an image (a captured image, that is, an imaging result) captured by the first imaging element or the second imaging element included in the encoder.

When the first arm 120 moves rotationally around the first axis J1 with respect to the base 110, for example, as illustrated in FIG. 5, a mark image 21A, which is an image of the mark 21 that is imaged in the captured image G acquired by the first imaging element 31a or the second imaging element 31b, moves along arcs C1 and C2 in the captured image G. Here, the arc C1 is a locus drawn by a bottom of the mark image 21A in FIG. 5 along with the rotational movement of the first arm 120 with respect to the base 110, and the arc C2 is a locus drawn by a top of the mark image 21A in FIG. 5 along with the rotational movement of the first arm 120 with respect to the base 110. In addition, FIG. 5 illustrates a case where three marks 21 are included within an imaging region RI illustrated in FIG. 4. In this respect, the captured image G illustrated in FIG. 5 includes a mark image 21B that positions on one side of the mark image 21A in the circumferential direction and a mark image 21X that positions on the other side thereof, in addition to the mark image 21A. The imaging region RI has the imaging regions RI1 and RI2 described above.

Here, the captured image G obtained by being captured by the first imaging element 31a or the second imaging element 31b has a shape corresponding to the imaging region RI and has a rectangular shape including two sides extending in the X-axis direction and two sides extending in the Y-axis direction. In addition, the two sides extending in the X-axis direction of the captured image G are disposed to follow the arcs C1 and C2 as much as possible. In addition, the captured image G has a plurality of pixels arranged into a matrix shape in the X-axis direction and the Y-axis direction. Here, a position of the pixel is represented by a pixel coordinate system (X, Y), in which "X" represents a position of the pixel in the X-axis direction, and "Y" represents a position of the pixel in the Y-axis direction. In addition, a desired region is cut from a region having a small aberration of a lens in a range of the captured image G so as to be set as the effective visual field region RU, and a pixel on an upper right end of the effective visual field region RU is set as an origin pixel (0, 0) of the image coordinate system (X, Y).

For example, in a case where the reference image TA corresponding to the mark image 21A is generated, the first arm 120 is caused to appropriately move rotationally with respect to the base 110, and the mark image 21A is positioned at a predetermined position (on a center line LY set at the center in the X-axis direction in the drawing) in the effective visual field region RU. Here, a rotation angle θA0 of the first arm 120 with respect to the base 110 when the mark image 21A is positioned at the corresponding position is acquired through measurement or the like in advance.

The captured image G is trimmed in a rectangular pixel range so as to be in a minimum necessary range including the mark image 21A, and thereby the reference image TA (template for detecting the mark 21) is acquired. The acquired reference image TA is stored in the storage unit 6. In this case, the reference image TA is stored together with angle information on the rotation angle θA0 described above and pixel information on a reference pixel coordinate (XA0, YA0), which is a pixel coordinate of a reference pixel (pixel at an upper left end in the drawing) in the pixel range of the reference image TA, in association therewith. In other words, the reference image TA, the angle information, and the pixel coordinate information are included in one template set which is used in the template matching.

Estimation of Rotation State by Using Template Matching

Next, the template matching by using the reference image TA generated as described above will be described with reference to FIGS. 6 to 9.

Figure 6:
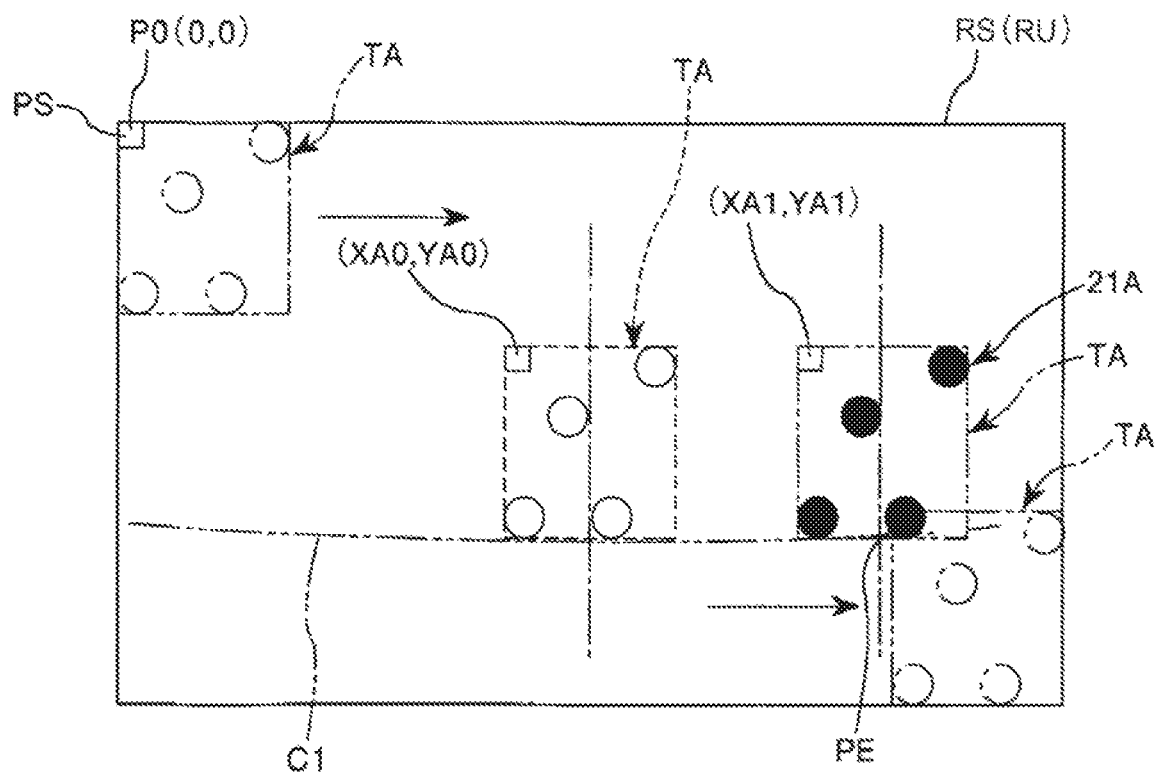
FIG. 6 is a view for illustrating template matching in a search region that is set in a captured image.
Figure 7:
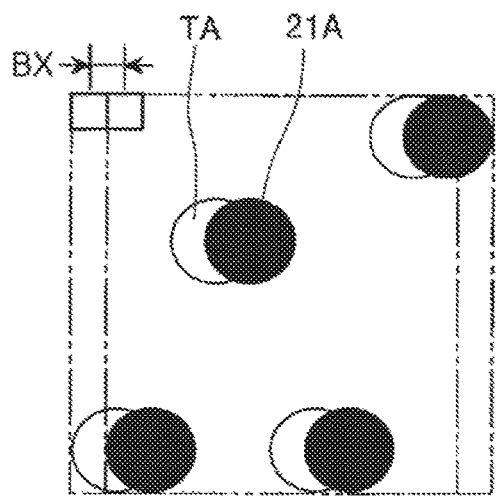
FIG. 7 is a view illustrating a deviated state by one pixel from a state of having the maximum similarity, when template matching is performed.
Figure 8:
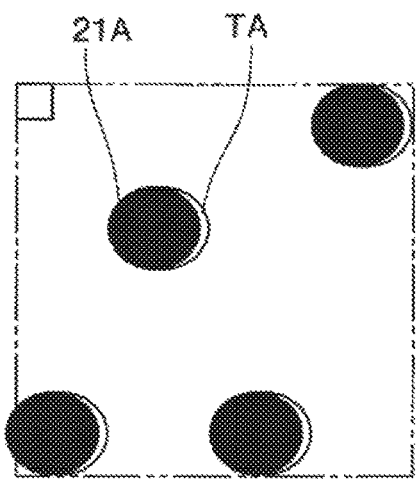
FIG. 8 is a view illustrating the state of having the maximum similarity, when the template matching is performed.
Figure 9:
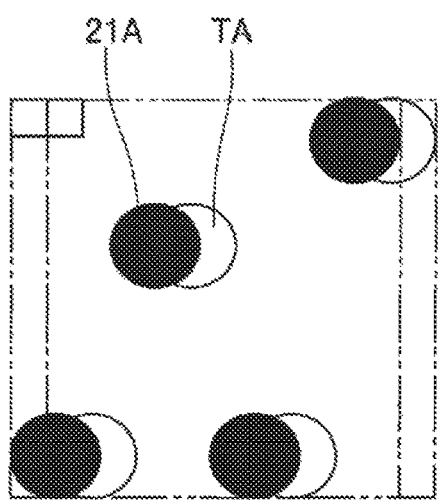
FIG. 9 is a view illustrating a deviated state by one pixel toward an opposite side with respect to the state illustrated in FIG. 7 from the state of having the maximum similarity, when template matching is performed.

FIG. 6 is a view for illustrating the template matching in a search region that is set in a captured image. FIG. 7 is a view illustrating a state of deviation by one pixel from a state of having the maximum similarity, when template matching is performed. FIG. 8 is a view illustrating the state of having the maximum similarity, when the template matching is performed. FIG. 9 is a view illustrating a state of deviation by one pixel toward an opposite side with respect to the state illustrated in FIG. 7 from the state of having the maximum similarity, when template matching is performed. SAD, SSD, ZNCC, or the like is used as a technique of obtaining similarity. A value thereof is minimum in the SAD and the SSD, and the maximum similarity is obtained in the ZNCC when the value thereof is the maximum.

As illustrated in FIG. 6, when the mark image 21A is present in the effective visual field region RU, the template matching with an image of the effective visual field region RU is performed by using the reference image TA. In the embodiment, the entire effective visual field region RU is set as the search region RS, the reference image TA overlaps the search region RS, and similarity of an overlap part between the search region RS and the reference image TA is calculated, while the reference image TA is deviated by one pixel with respect to the search region RS. Here, pixel coordinates of reference pixels of the reference image TA move by one pixel from a start coordinate PS (origin pixel P0) to an end pixel PE, and the similarity of the overlap part between the search region RS and the reference image TA with respect to pixels of the entire search region RS is calculated for each pixel coordinate of the reference pixels of the reference image TA. The calculated similarity is stored in the storage unit 6, as similarity data of captured image data and reference image data in association with the pixel coordinate of the reference pixel of the reference image TA.

Next, among a plurality of similarities for each pixel coordinate stored in the storage unit 6, a similarity having the maximum value is selected, and a pixel coordinate (XA1, YA1) of the reference image TA having the selected similarity is determined as a pixel coordinate of the mark image 21A. In this manner, it is possible to detect the position of the mark image 21A in the captured image G.

Here, in obtaining the pixel coordinate of the mark image 21A, it is preferable to use a subpixel estimation method. As illustrated in FIGS. 7 to 9, in the vicinity of a position at which the maximum similarity is obtained, the reference image TA overlaps the mark image 21A. The similarity in a state illustrated in FIG. 8 is higher than that in states illustrated in FIGS. 7 and 9 (state of a deviation by one pixel from the state illustrated in FIG. 8) and becomes the maximum similarity. However, as illustrated in the state illustrated in FIG. 8, in a case where the reference image TA is deviated not to completely match and overlap the mark image 21A, and the state illustrated in FIG. 8 is determined as the pixel position of the mark image 21A, the deviation becomes an error. The deviation is a pixel size BX at the maximum. In other words, in a case where the subpixel estimation method is not used, the pixel size BX has minimum resolution (accuracy). By comparison, in the subpixel estimation method, a coordinate of the maximum similarity and similarity values of eight coordinates adjacent thereto from a map of similarity obtained at intervals of a pixel size BX through the template matching are fitted on a parabolic surface, and thereby it is possible to perform complementation (approximation) between the similarities (between pixel pitches). Therefore, it is possible to obtain the pixel coordinate of the mark image 21A with higher accuracy.

In this manner, the processor 5 sets the search region RS in the effective visual field region RU which is a part of a region of the captured image G and performs the template matching in the search region RS. Consequently, it is possible to decrease the number of pixels of the search region RS by using the template matching, and it is possible to shorten a computation time related to the template matching. Therefore, even in a case where an angular velocity of the first arm 120 around the first axis J1 is high, it is possible to perform detection with high accuracy. In addition, even when the distortion or blurring on an outer circumferential part of the captured image G increases due to the aberration of the first optical system 32a or the second optical system 32b which is disposed between the first imaging element 31a or the second imaging element 31b and the mark 21, it is possible to reduce degradation of detection accuracy by using the search region RS in which the distortion or the blurring is low. The reference image TA may be generated and the template matching may be performed by using the captured image G, and in this case, it is preferable to perform correction with consideration for the aberration, as necessary.

In the embodiment, since a distance between the imaging region RI and the first axis J1 is sufficiently long, the arcs C1 and C2 can approximate to the straight line in the captured image G. Hence, a movement direction of the mark image 21A in the captured image G can be considered to be coincident with the X-axis direction.

Then, the mark image 21A illustrated in FIG. 6 is disposed at a position deviated by the number of pixels (XA1−XA0) in the X-axis direction with respect to the reference image TA that is positioned in the reference pixel coordinate (XA0, YA0). Hence, when R represents a distance between the center of the imaging region RI and the first axis J1, and BX represents a width (a visual field size per one pixel of the imaging element 31) of a region on the imaging region RI in the X-axis direction, the width corresponding to one pixel of the imaging element 31, it is possible to obtain a rotation angle θ of the first arm 120 with respect to the base 110 by using Expression (1).

$$\theta = \theta A0 + \frac{(XA1 - XA0) \times BX}{2\pi R} \times 360[°]$$
Expression (1)

In Expression (1), (XA1−XA0)×BX corresponds to a distance between an actual position corresponding to the reference pixel coordinate (XA0, YA0) of the reference image TA and an actual position corresponding to the pixel coordinate (XA1, YA1) of the reference image TA having the maximum value of similarity described above. In addition, 2πR corresponds to a length of locus (a length of a circumference) of the mark 21 when the first arm 120 rotates by 360° with respect to the base 110. As described above, θA0 represents a rotation angle of the first arm 120 with respect to the base 110 when the mark image 21A is positioned at a predetermined position. In addition, the rotation angle θ is an angle of the first arm 120 that moves rotationally from the reference state (0°) with respect to the base 110.

The template matching and the calculation of rotation angle θ by using the template matching described above are similarly performed with another mark 21. Here, at least one mark 21 is imaged without a defect in the effective visual field region RU at any rotation angle θ, and a reference image corresponding to each of the marks 21 is registered such that it is possible to perform the template matching. Consequently, it is possible to prevent an angle region, in which it is not possible to perform the template matching, from appearing.

In FIG. 5 described above, the marks 21 and the effective visual field region RU are configured such that one mark 21 is imaged without a defect in the effective visual field region RU at any rotation angle θ; however, it is preferable that the marks 21 and the effective visual field region RU are configured such that a plurality of marks 21 are imaged without a defect in the effective visual field region RU at any rotation angle θ. In this case, the template matching is performed by using two or more reference images corresponding to two or more marks 21 which are adjacent to each other such that it is possible to perform the template matching with the plurality of marks 21 imaged in the effective visual field region RU at any rotation angle θ. In this case, the two or more reference images may partially overlap each other.

In other words, it is preferable that the imaging element 31 images at least two entire marks 21 of the plurality of marks 21, which are targets of the template matching. Consequently, even when it is not possible to accurately read one mark 21 of two marks 21 imaged by the imaging element 31 due to a stain or the like, it is possible to read and detect the other mark 21. Therefore, it is advantageous to easily secure highly accurate detection. In this manner, it is preferable that the processor 5 performs the template matching by using a plurality of reference images with respect to the search region RS at the same time. Consequently, it is possible to enhance the detection accuracy.

Determination of Reference Image

Figure 10:
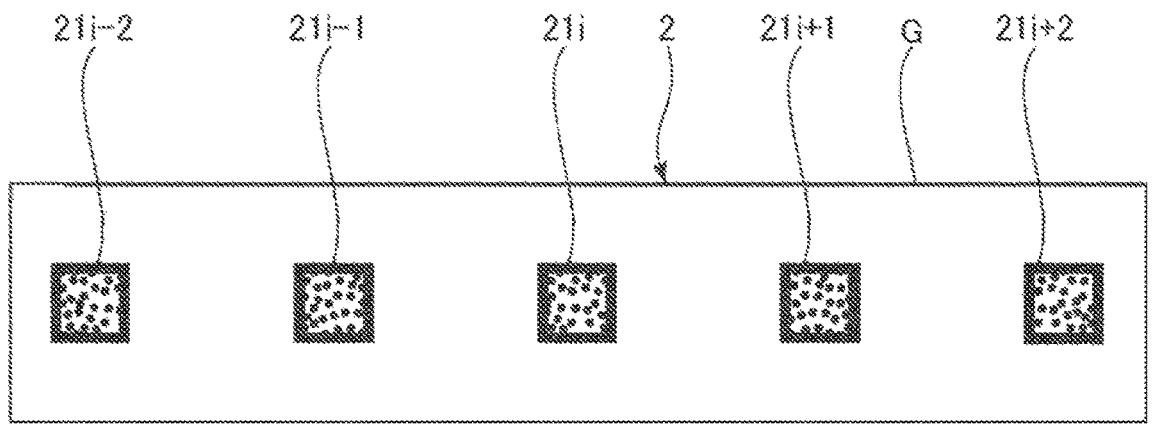
FIG. 10 is a view for illustrating a plurality of marks included in a scale portion.
Figure 11:
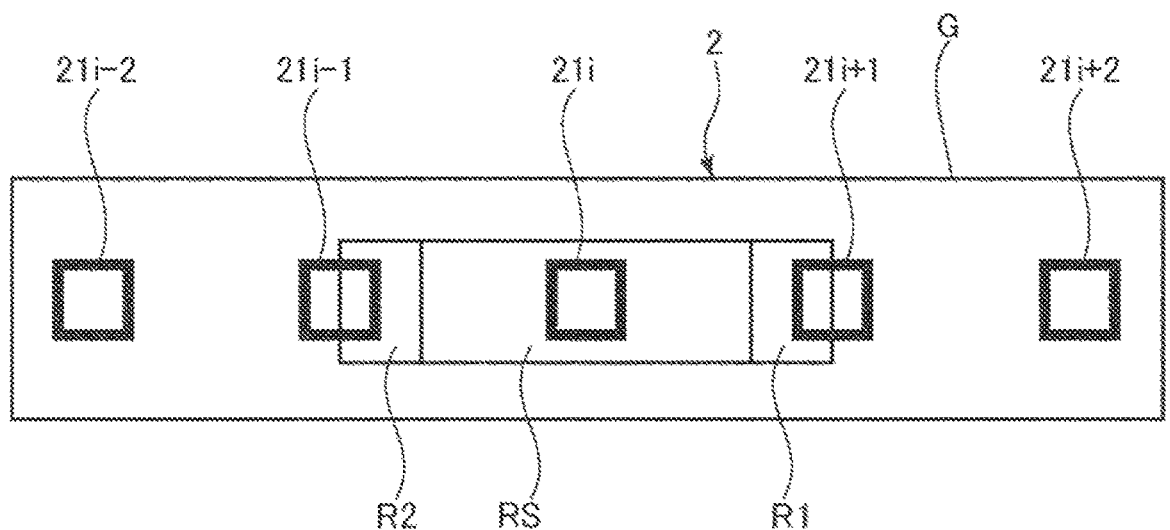
FIG. 11 is a view illustrating a state in which, of the plurality of marks, one mark is detected through the template matching.
Figure 12:
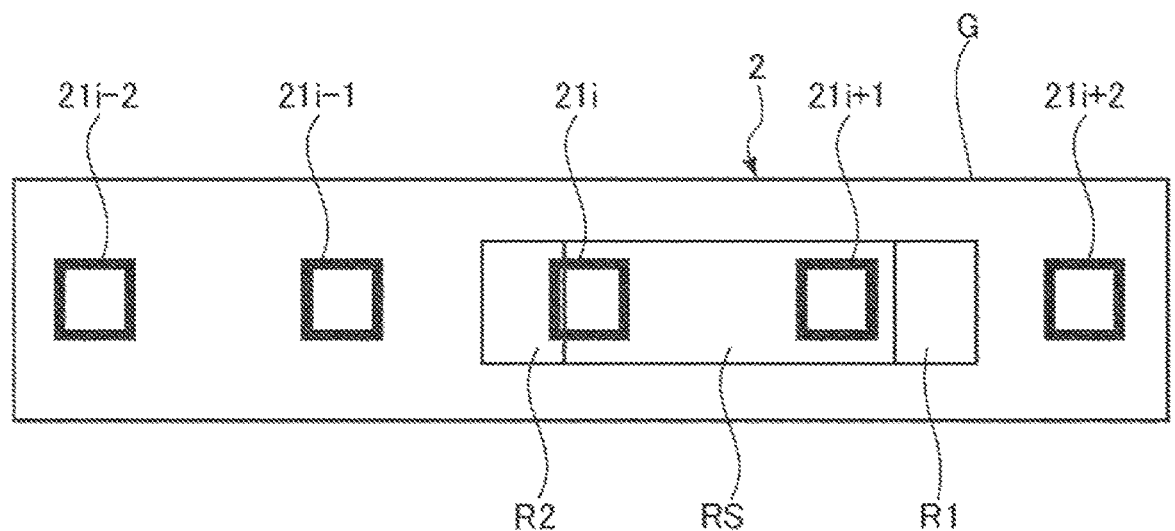
FIG. 12 is a view for illustrating prediction of a reference image that is used in the following template matching after the template matching (previous template matching).

FIG. 10 is a view for illustrating the plurality of marks provided on the scale portion. FIG. 11 is a view illustrating a state in which, of the plurality of marks, one mark is detected through the template matching. FIG. 12 is a view for illustrating prediction of the reference image that is used in the following template matching after the template matching (previous template matching). FIG. 10 illustrates the pattern of the scale portion 2; however, in FIGS. 11 and 12, for convenience of description, the pattern of the scale portion 2 is omitted.

As illustrated in FIG. 10, the plurality of marks 21 arranged on the scale portion 2 in the rotation direction thereof are set. FIG. 10 illustrates a state in which five marks 21i−2 to 21i+2 from i−2-th to i+2-th marks are imaged in the captured image G. i represents a number assigned to the marks 21 in an arrangement order and is an integer from 1 to n when n marks 21 are set on the scale portion 2 (n is an integer of 3 or higher).

As illustrated in FIG. 11, the search region RS described above is set in the captured image G. The search region RS is set, in which one mark 21 is always imaged without a defect. In the drawing, the mark 21i is imaged in the search region RS, and the processor 5 performs the template matching as described above by using the reference image corresponding to the mark 21i (hereinafter, also referred to as a "reference image i") so as to detect a position of the mark 21i by performing. The processor 5 estimates the rotation state as described above on the basis of the detected position.

Here, when the scale portion 2 rotates, the marks 21i moves along with the rotation of the scale portion in the rotation direction of the scale portion 2 (the right-left direction in FIG. 11) in the search region RS. In this case, while the reference image i is acquired along with movement of the mark 21i, the processor 5 performs the template matching (hereinafter, also referred to as the "previous template matching") so as to sequentially detect the position of the mark 21i.

It is possible to detect the position of the mark 21i when the mark 21i is imaged in the search region RS. When the mark 21i is not imaged in the search region RS along with the rotation of the scale portion 2, the mark 21i−1 or 21i+1 adjacent to the mark 21i is imaged in the search region RS. Hence, when the mark 21i is not imaged in the search region RS, the processor 5 performs the template matching (hereinafter, also referred to as the "following template matching") by using a reference image corresponding to the mark 21i−1 (hereinafter, also referred to as a "reference image i−1") or a reference image corresponding to the mark 21i+1 (hereinafter, also referred to as a "reference image i+1") so as to detect a position of the mark 21i−1 or the mark 21i+1.

Here, the processor 5 predicts the reference image that is used in the following template matching based on a result (detected position of the mark 21i) of the previous template matching. To be more specific, a first region R1 (first detection region) is set to be adjacent to the search region RS on one side (right side in FIG. 11) thereof in a movement direction of the mark 21i, and a second region R2 (second detection region) is set to be adjacent to the search region on the other side (left side in FIG. 11) thereof. In a case where the mark 21$i$ reaches the second region R2 as illustrated in FIG. 12, that is, in a case where a left end of the mark 21$i$ in the drawing is out of the search region RS, the processor 5 predicts that a reference image that is used in the following template matching is the reference image corresponding to the mark 21$i$+1. On the other hand, although not illustrated, in a case where the mark 21$i$ reaches the first region R1, that is, in a case where a right end of the mark 21$i$ is out of the search region RS, the processor 5 predicts that a reference image that is used in the following template matching is the reference image corresponding to the mark 21$i$−1.

The reference image that is used in the following template matching is described as described above, and thereby it is possible to early detect the position of the mark 21$i$+1 or the mark 21$i$−1 in the following template matching. Therefore, it is possible to reduce an occurrence of a blank state in which the position of the mark 21 is not detected, and thus it is possible to improve the detection accuracy.

By comparison, in a case where the reference image that is used in the following template matching as described above is not predicted, and the mark 21$i$ is not imaged in the search region RS, it is necessary to perform the template matching by using all of the reference images corresponding to the n marks 21 sequentially and select a reference image having the maximum similarity. Therefore, a large amount computation is likely to be performed for the template matching in the processor 5. As a result, a period of time of a blank state in which the position of the mark 21 is prolonged, and thus there is a possibility that the detection accuracy will be degraded.

In FIGS. 11 and 12, the first region R1 and the second region R2 do not overlap each other in the search region RS; however, when the previous mark 21 reaches the first region R1 or the second region R2, the next mark 21 may be imaged without a defect in the search region RS, and the first region R1 and the second region R2 may be set to overlap each other in at least a part thereof in the search region RS.

Hereinafter, a flow of determination of the reference image in the processor 5 will be described with reference to FIGS. 13 and 14.

Figure 13:
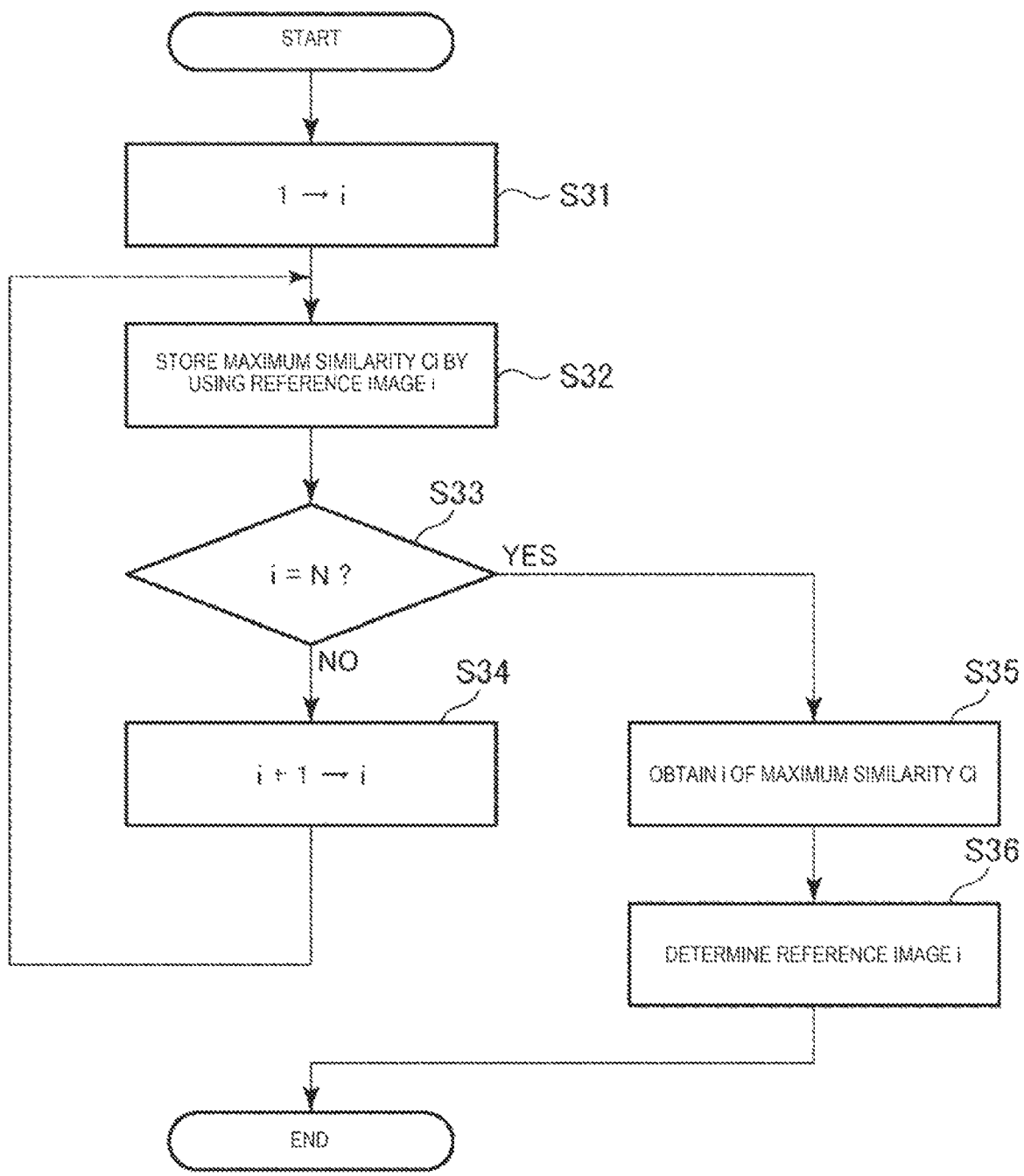
FIG. 13 is a flowchart illustrating a method for determining a reference image that is used in the first template matching.

FIG. 13 is a flowchart illustrating a method for determining the reference image that is used in the first template matching. FIG. 14 is a flowchart illustrating a method for determining (a method for predicting) the reference image that is used in the following template matching.

First, as illustrated in FIG. 13, in the first template matching, i is set to 1 (Step S31). A search in the search region RS is performed by using the reference image i (i=1 at first), and the maximum similarity $C_i$ is stored to correspond to a number i in the storage unit 6 (Step S32). Then, whether or not the number i is equal to N is determined (Step S33). In a case where i is equal to N (NO in Step S33), i+1 is set as i (Step S34), and the process proceeds to Step S32 described above. Consequently, the maximum similarities $C_i$ (C1 to CN) from the reference image i (i=1) to the reference image i (i=N) are stored to correspond to the numbers i (1 to N) in the storage unit 6.

In a case where the number i is equal to N (YES in Step S33), a number i of the maximum similarity $C_i$ of the maximum similarities $C_i$ (C1 to CN) from the reference image i (i=1) to the reference image i (i=N) is obtained from information stored in the storage unit 6 (Step S35), and the reference image i is determined (Step S36).

As described above, the processor 5 obtains the maximum similarity $C_i$ of the captured image G with each of the reference images by using the N (three or more) reference images sequentially with respect to the captured image G and selects at least one reference image from the N (three or more) reference images based on the maximum similarity $C_i$. Consequently, it is possible to determine the reference image i that is used in the template matching in an initial state (before starting the template matching). After the reference image i is determined, the mark 21$i$ that is imaged in the search region RS is determined, and thus a reference image is predicted in the following flow.

Figure 14:
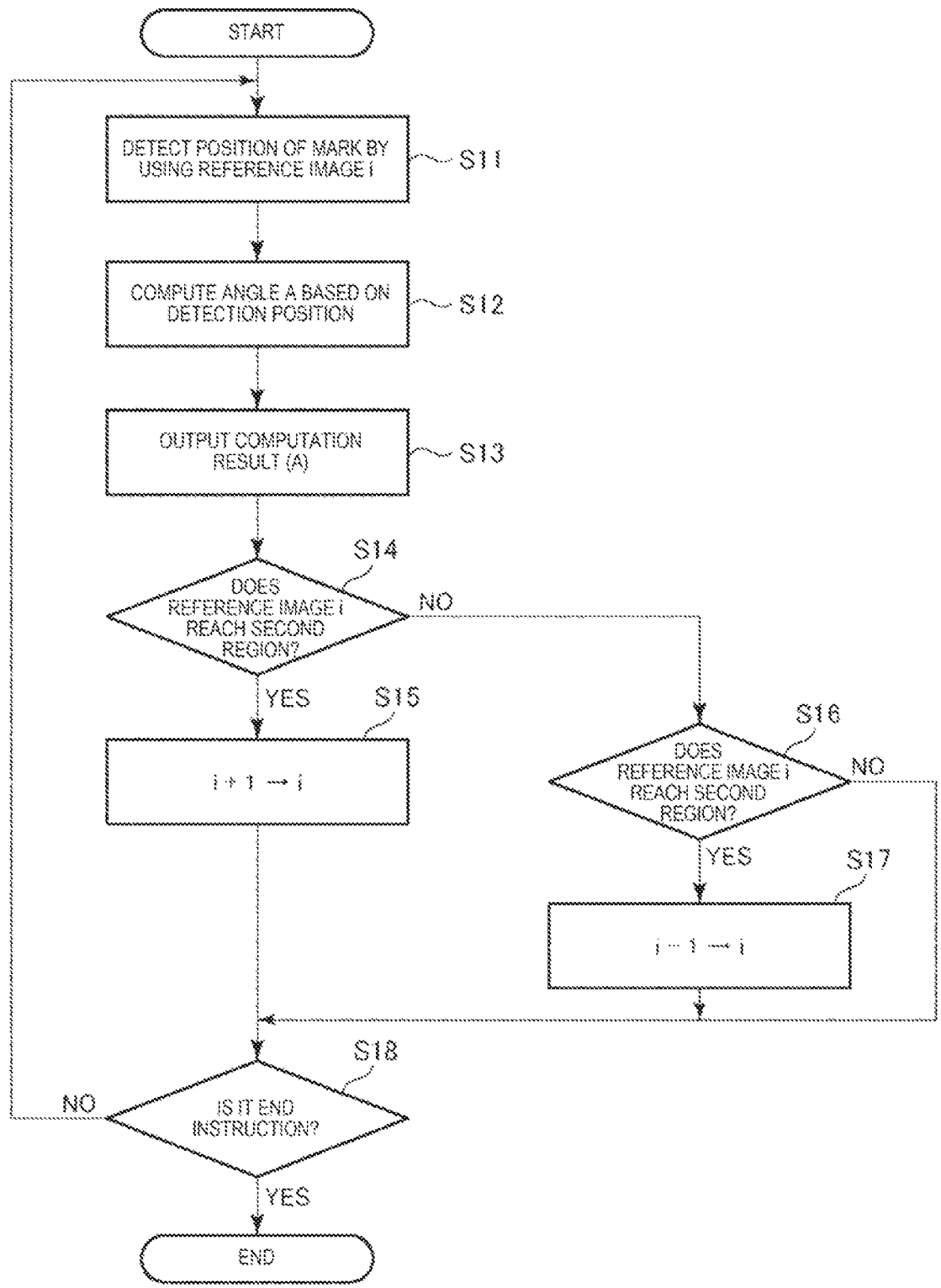
FIG. 14 is a flowchart illustrating a method for determining (a method for predicting) a reference image that is used in the following template matching.

First, as illustrated in FIG. 14, the position of the mark 21$i$ is detected through the template matching performed by using the reference image i (Step S11). Then, an angle A, which is a rotation angle of the scale portion 2, is computed, based on the detected position of the mark (Step S12). The angle A, which is a result of the computation, is output (Step S13).

Next, whether or not the reference image i acquired along with the movement of the mark 21$i$ reaches the second region R2 is determined (Step S14). In a case where the reference image i reaches the second region R2 (YES in Step S14), i+1 is set as i (Step S15). In other words, in this case, a reference image that is used in the following template matching is predicted to be the reference image i+1 corresponding to the mark 21$i$+1. Then, whether or not an end instruction is issued is determined (Step S18). In a case where the end instruction is not issued (NO in Step S18), the process proceeds to Step S11 described above, and the following template matching using the reference image i+1 is performed.

On the other hand, in a case where the reference image i acquired along with the movement of the mark 21$i$ does not reach the second region R2 (NO in Step S14), whether or not the reference image i acquired along with the movement of the mark 21$i$ reaches the first region R1 is determined (Step S16). In a case where the reference image i reaches the first region R1 (YES in Step S16), i−1 is set as i (Step S17). In other words, in this case, a reference image that is used in the following template matching is predicted to be the reference image i−1 corresponding to the mark 21$i$−1. Then, whether or not the end instruction is issued is determined (Step S18). In a case where the end instruction is not issued (NO in Step S18), the process proceeds to Step S11 described above, and the following template matching using the reference image i−1 is performed.

In addition, in a case where the reference image i acquired along with the movement of the mark 21$i$ does not reach the first region R1 or the second region R2 (NO in Step S14 and NO in Step S16), Steps S11 to S13 described above are repeated until the reference image i reaches the first region R1 or the second region R2 or the end instruction is issued.

Measurement Error Due to Axial Run-Out and Reduction Thereof

Figure 15:
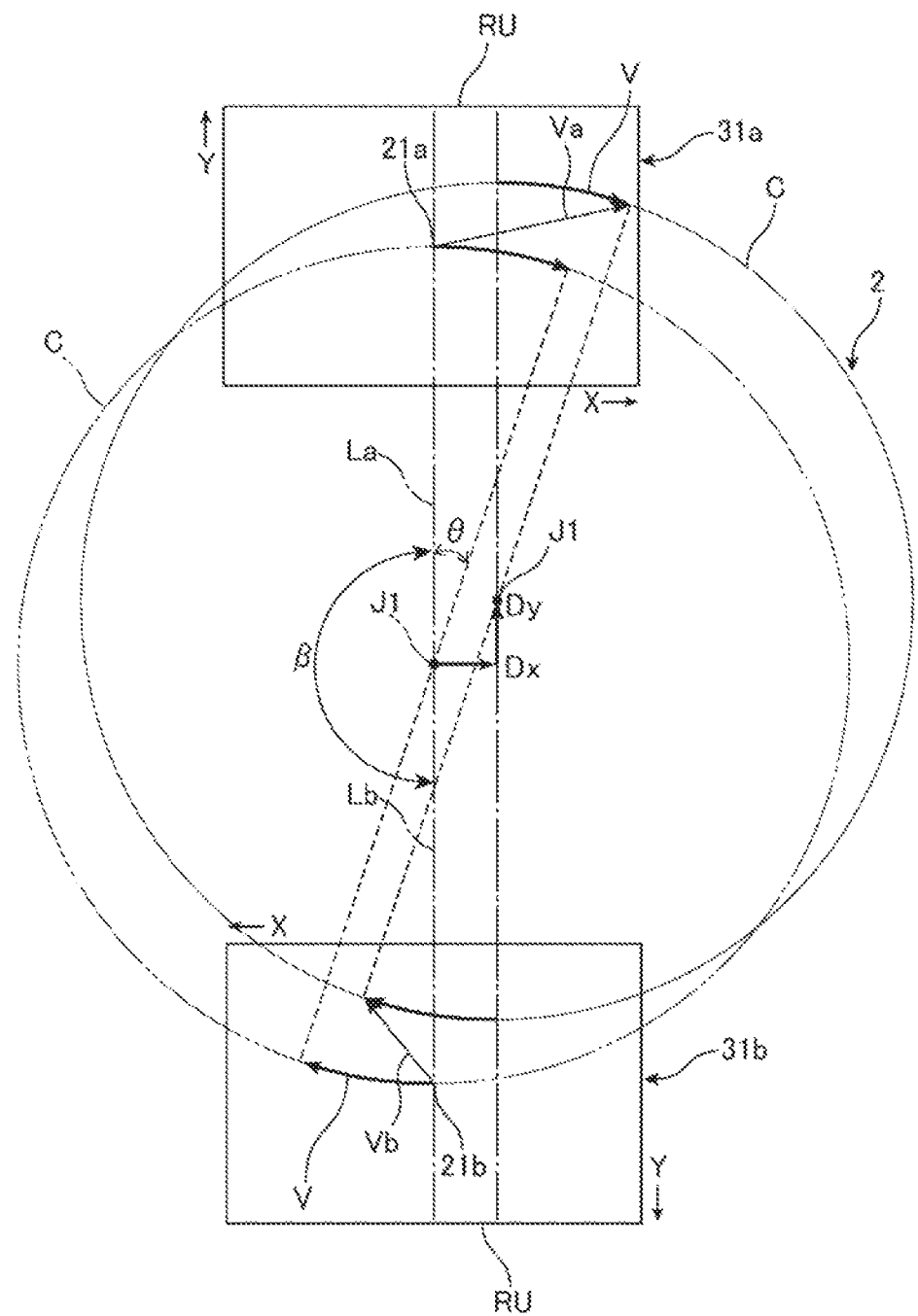
FIG. 15 is a schematic diagram illustrating a relationship between run-out of a rotary shaft and a first movement amount and a second movement amount.
Figure 16:
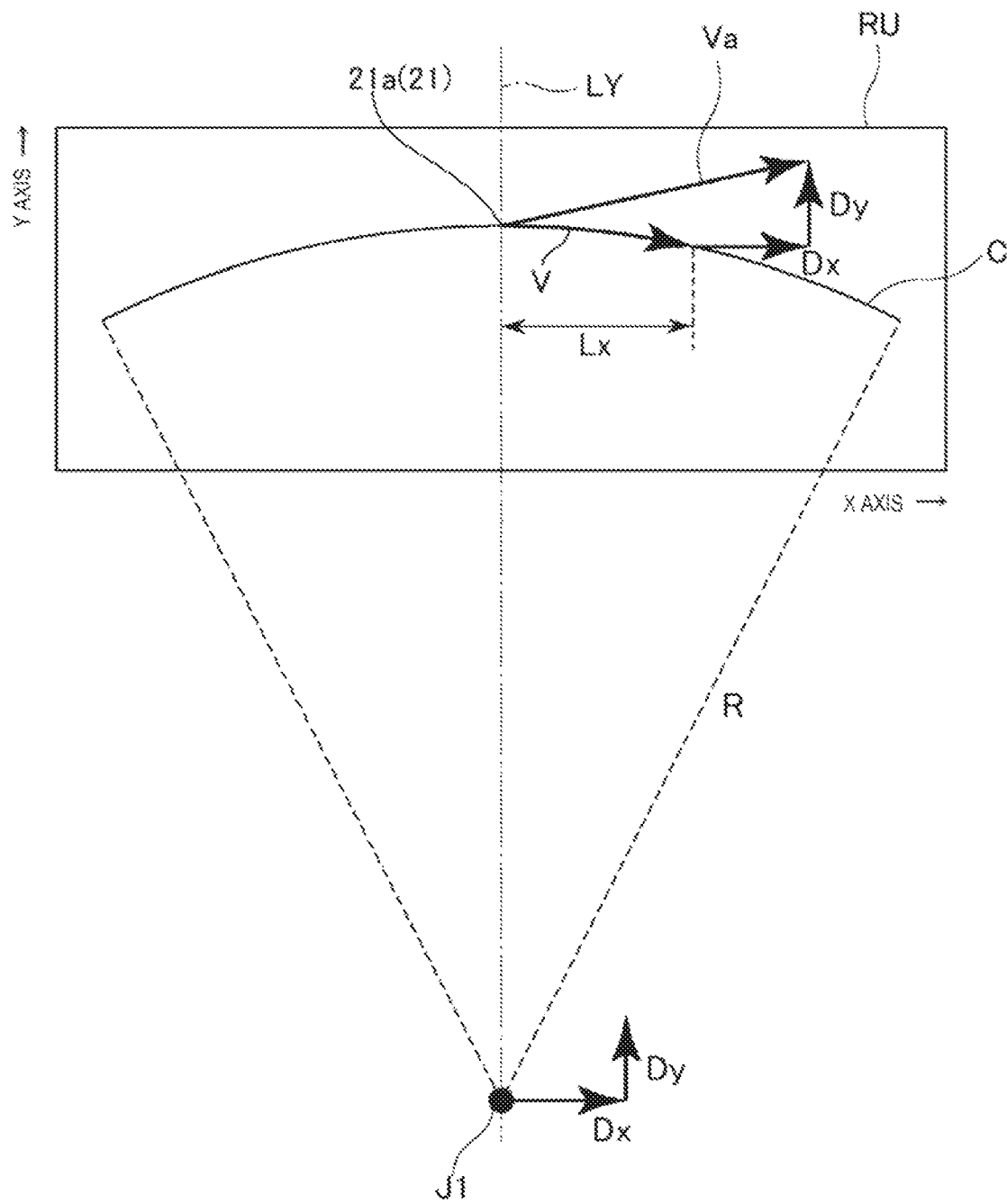
FIG. 16 is a schematic diagram illustrating a relationship between an effective visual field region and a movement locus of the scale portion.
Figure 17:
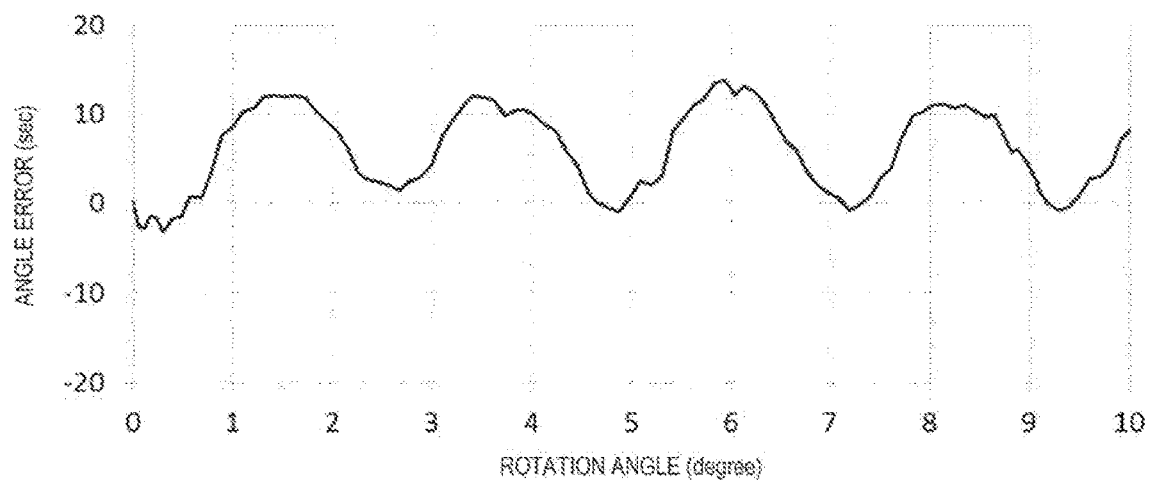
FIG. 17 is a graph illustrating a relationship between a rotation angle and an error in angle measurement by using the first imaging element.
Figure 18:
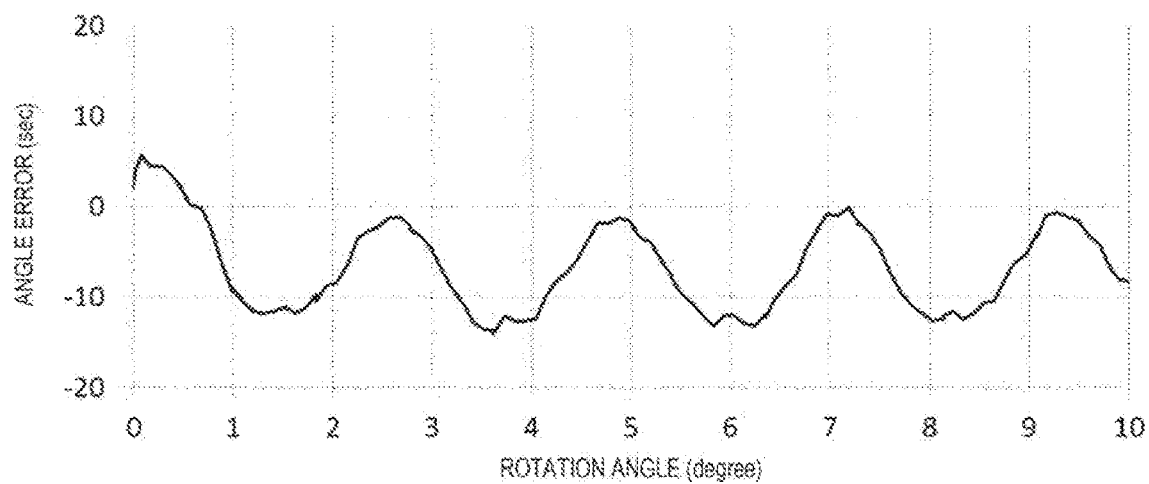
FIG. 18 is a graph illustrating a relationship between a rotation angle and an error in angle measurement by using the second imaging element.
Figure 19:
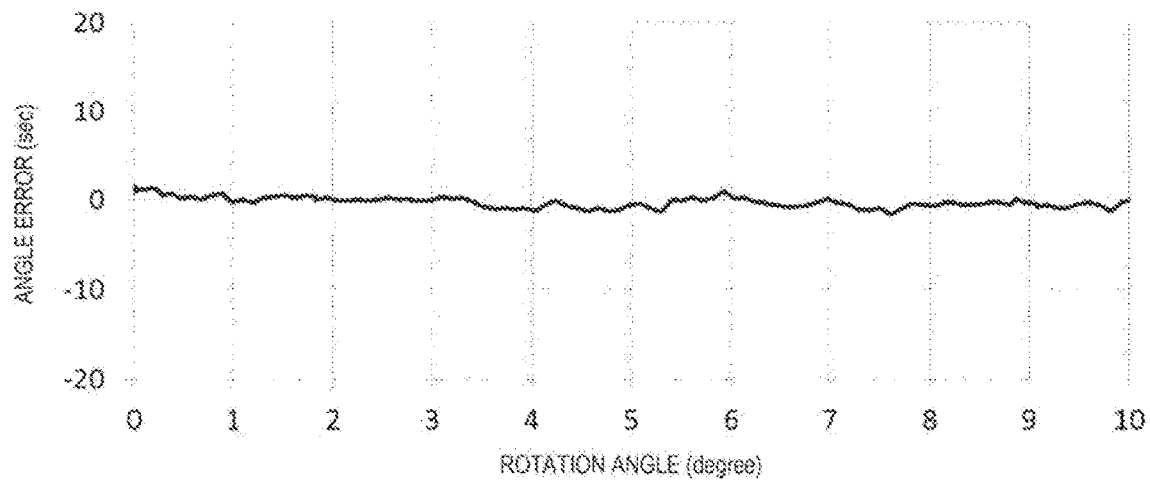
FIG. 19 is a graph illustrating a relationship between a rotation angle and a measurement error in angle measurement by using the first imaging element and the second imaging element.
Figure 20:
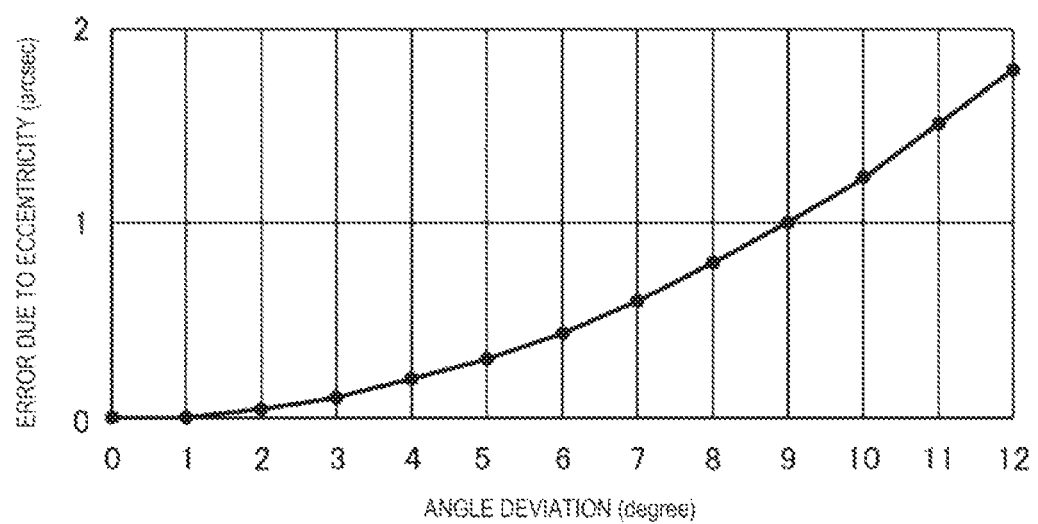
FIG. 20 is a graph illustrating a relationship between a positional deviation and a measurement error of the first imaging element and the second imaging element.

FIG. 15 is a schematic diagram illustrating a relationship between run-out of a rotary shaft and a first movement amount and a second movement amount. FIG. 16 is a schematic diagram illustrating a relationship between the effective visual field region and a movement locus of the scale portion. FIG. 17 is a graph illustrating a relationship between a rotation angle and an error in angle measurement by using the first imaging element. FIG. 18 is a graph illustrating a relationship between a rotation angle and an error in angle measurement by using the second imaging element. FIG. 19 is a graph illustrating a relationship between a rotation angle and a measurement error in angle measurement by using the first imaging element and the second imaging element. FIG. 20 is a graph illustrating a relationship between a positional deviation and a measurement error of the first imaging element and the second imaging element.

As described above, the processor 5 estimates the rotation states by using both of the captured images acquired by the first imaging element 31*a* and the second imaging element 31*b*, and thereby the measurement error due to axial run-out along with the rotation of the output shaft of the speed reducer 112 is decreased. Hereinafter, a principle thereof will be described. Hereinafter, for convenience of description, the first detector 3*a* and the second detector 3*b* are disposed with respect to each other such that a tangential line to the arc C at an intersection point between the center line LY and the arc C as the locus of the mark 21 is parallel to the X axis. In addition, as illustrated in FIGS. 15 and 16, a direction in which the mark 21 that moves in the effective visual field region RU faces is defined as a forward direction of the X axis, and a direction in which the mark 21 that moves in the effective visual field region RU moves away from the first axis J1 is defined as a forward direction of the Y axis. In addition, it is preferable that the effective visual field region RU is a region in which an aberration or an image distortion of the lens is low.

The mark 21 is imaged at the center of the effective visual field region RU of the first imaging element 31*a* and the second imaging element 31*b* at a time point 0. Then, at a time point t, as illustrated in FIG. 15, when the scale portion 2 rotates around the first axis J1 at the rotation angle θ clockwise and the first axis J1 translates, a translation vector is represented by (Dx, Dy) in a coordinate system of the first imaging element 31*a* and is represented by (−Dx, −Dy) in a coordinate system of the second imaging element 31*b*. In other words, the translation vectors in the coordinate systems of the first imaging element 31*a* and the second imaging element 31*b* are opposite to each other.

Here, when the template matching is performed with respect to the effective visual field regions RU of both the first imaging element 31*a* and the second imaging element 31*b*, movement vectors Va and Vb of the reference image are obtained. The movement vectors Va and Vb are resultant vectors of the translation vectors described above and the original movement vectors V in a case where translation of the first axis J1 does not occur. Hence, when the movement vectors Va and Vb are added to be divided by 2, it is possible to offset the translation vector and obtain the original movement vector (Lx, Ly). The movement vector Va is a first movement amount of a first mark 21*a* imaged by the first imaging element 31*a*. In addition, the movement vector Vb is a second movement amount of a second mark 21*b* imaged by the second imaging element 31*b*.

In addition, since the arc C has a sufficiently large radius, the arc C in the effective visual field region RU can approximate to a straight line having only an X-axis-direction component. Therefore, when an X-axis-direction component Lx of the original movement vector is found, it is possible to obtain the rotation angle θ by using a relational expression of θ=arcsin (Lx/R).

In the relational expression, R represents the radius of the arc C. At the time point 0, when a distance between the first axis J1 and the first imaging element 31*a* is represented by RA, and a distance between the first axis J1 and the second imaging element 31*b* is represented by RB (RA and RB are not illustrated), an average of the distances RA and RB has a relationship of (RA+RB)/2=R and t and is constant at the time points 0. Hence, when the radius R is accurately measured in advance, it is possible to obtain the rotation angle θ through the above-described method without an influence of the translation of the first axis J1. In addition, when the rotation angle θ is minute, it is possible to obtain an approximate relationship of sin θ ≈θ [radian], and it is possible to obtain the rotation angle θ through simply computation of a relational expression of θ=Lx/R. In a case where it is possible to tolerate an error, which occurs by approximating the arc C to the straight line having only the X-axis-direction component, to 1 arcsec (1/3600 degrees), the relational expression can is applied within a range in which θ is 0.041 rad (2.3 degrees) or smaller.

In this manner, it is possible to calculate the rotation angle θ by using the movement vector Va (first movement amount) obtained by performing template matching with the captured image G acquired by the first imaging element 31*a* and the movement vector Vb (second movement amount) obtained by performing the template matching with the captured image G acquired by the second imaging element 31*b*.

In a case where the rotation angle θ is calculated by using only the movement vector Va (first movement amount), an angle error (hereinafter, also referred to as a "first angle error") that changes with time as illustrated in FIG. 17 due to dynamic eccentricity (axial run-out) of the first axis J1 along with the rotation of the output axis of the speed reducer 112 occurs. On the other hand, in a case where the rotation angle θ is calculated by using only the movement vector Vb (second movement amount), an angle error (hereinafter, also referred to as a "second angle error") that changes with time as illustrated in FIG. 18 due to dynamic eccentricity of the first axis J1 along with the rotation of the output axis of the speed reducer 112 occurs.

Here, when one of the first angle error and the second angle error increases on the plus side, the other angle error increases on the minus side. Hence, as described above, when the rotation angle θ is calculated by using the movement vector Va (first movement amount) and the movement vector Vb (second movement amount), the first angle error and the second angle error are offset or reduced as by each other, and the angle error is small as illustrated in FIG. 19.

In order to reduce the angle error, as illustrated in FIG. 15, an angle β formed between a straight line La that connects the first axis J1 and the first imaging element 31*a* and a straight line Lb that connects the first axis J1 and the second imaging element 31*b* is most preferably 180 degrees, when viewed in a direction parallel to the first axis J1 (rotary shaft); however, it is possible to tolerate an angular deviation within a range of ±6 degrees with respect to 180 degrees (hereinafter, also simply referred to as the "angular deviation"). Hereinafter, a reason thereof will be described.

An eccentricity amount of the dynamic rotary shaft along with the rotation of the output shaft in a common speed reducer (for example, a wave speed reducer) is about ±20 μm. In such a case, an angle error due to the dynamic eccentricity increases as the angular deviation increases, as illustrated in FIG. 20. Here, in a case where a total tolerable accuracy error is 1 arcsec, it is preferable to suppress the angle error due to the eccentricity to about 0.5 arcsec. Then, as found from FIG. 20, it is preferable that the angular deviation is 6 degrees or smaller.

In this manner, the angle β formed between the straight line La that connects the first axis J1 and the first imaging element 31*a* and the straight line Lb that connects the first axis J1 and the second imaging element 31*b* is preferably in a range from 174 degrees to 186 degrees, when viewed in a direction parallel to the first axis J1 (rotary shaft). Consequently, it is possible to suppress the accuracy error to 1 arcsec or smaller. More preferably, the angular deviation is 4 degrees or smaller, and thereby it is possible to suppress the angle error due to the eccentricity to 0.2 arcsec or smaller.

As described above, the encoder unit 10 includes the speed reducer 112 that has the output shaft which rotates around the first axis J1 (rotary shaft) so as to output the drive force and the encoder 1 that measures the rotation angle of the output shaft of the speed reducer 112. The encoder 1 includes the first arm 120 as the rotary unit, which rotates around the first axis J1 along with the rotation of the output shaft of the speed reducer 112, the scale portion 2 that is disposed on the first arm 120 in the circumferential direction around the first axis J1 and has the first mark 21a and the second mark 21b, the first imaging element 31a that images the first mark 21a, the second imaging element 31b that is disposed at the position symmetrical with the first imaging element 31a with respect to the first axis J1 and images the second mark 21b, the processor 5 that performs the process of obtaining the rotation angle of the first arm 120 based on the imaging results imaged by the first imaging element 31a and the second imaging element 31b, and a storage unit 6 that stores the instruction that is readable by the processor 5. The processor 5 reads the instruction from the storage unit 6 such that the template matching with the image captured by the first imaging element 31a is performed to obtain the movement vector Va (first movement amount) in the circumferential direction of the first mark 21a around the first axis J1, the template matching with the image captured by the second imaging element 31b is performed to obtain the movement vector Vb (second movement amount) in the circumferential direction of the second mark 21b around the first axis J1, and the rotation angle θ is calculated and output by using the movement vector Va and the movement vector Vb.

According to the encoder unit 10, it is possible to reduce the error by the eccentricity of the scale portion 2 due to the axial run-out of the output shaft of the speed reducer 112, and thus it is possible to enhance the measurement accuracy.

Here, it is preferable that the processor 5 performs the template matching by using a reference image (first reference image corresponding to the first mark 21a) in association with information on the angle, when obtaining the movement vector Va (first movement amount). Consequently, it is possible to measure the rotation angle of the first arm 120, as an absolute angle. Similarly, it is preferable that the processor 5 performs the template matching by using a reference image (second reference image corresponding to the second mark 21b) in association with information on the angle, when obtaining the movement vector Vb (second movement amount).

In addition, in the angle measuring method of the embodiment, the rotation angle of the output shaft of the speed reducer 112 is measured by using the encoder 1 that includes the first arm 120 as the rotary unit, which rotates around the first axis J1 along with the rotation of the output shaft of the speed reducer 112 that has the output shaft which rotates around the first axis J1 (rotary shaft) so as to output the drive force, the scale portion 2 that is disposed on the first arm 120 in the circumferential direction around the first axis J1 and has the first mark 21a and the second mark 21b, the first imaging element 31a that images the first mark 21a, and the second imaging element 31b that is disposed at the position symmetrical with the first imaging element 31a with respect to the first axis J1 and images the second mark 21b. Here, the angle measuring method includes a step of performing the template matching with the image captured by the first imaging element 31a and obtaining the movement vector Va (first movement amount) in the circumferential direction of the first mark 21a around the first axis J1, a step of performing the template matching with the image captured by the second imaging element 31b and obtaining the movement vector Vb (second movement amount) in the circumferential direction of the second mark 21b around the first axis J1, and a step of calculating and outputting the rotation angle of the first arm 120 by using the movement vector Va and the movement vector Vb.

According to the angle measuring method, it is possible to reduce the error by the eccentricity of the scale portion 2 due to the axial run-out of the output shaft of the speed reducer 112, and thus it is possible to enhance the measurement accuracy.

Second Embodiment

Figure 21:
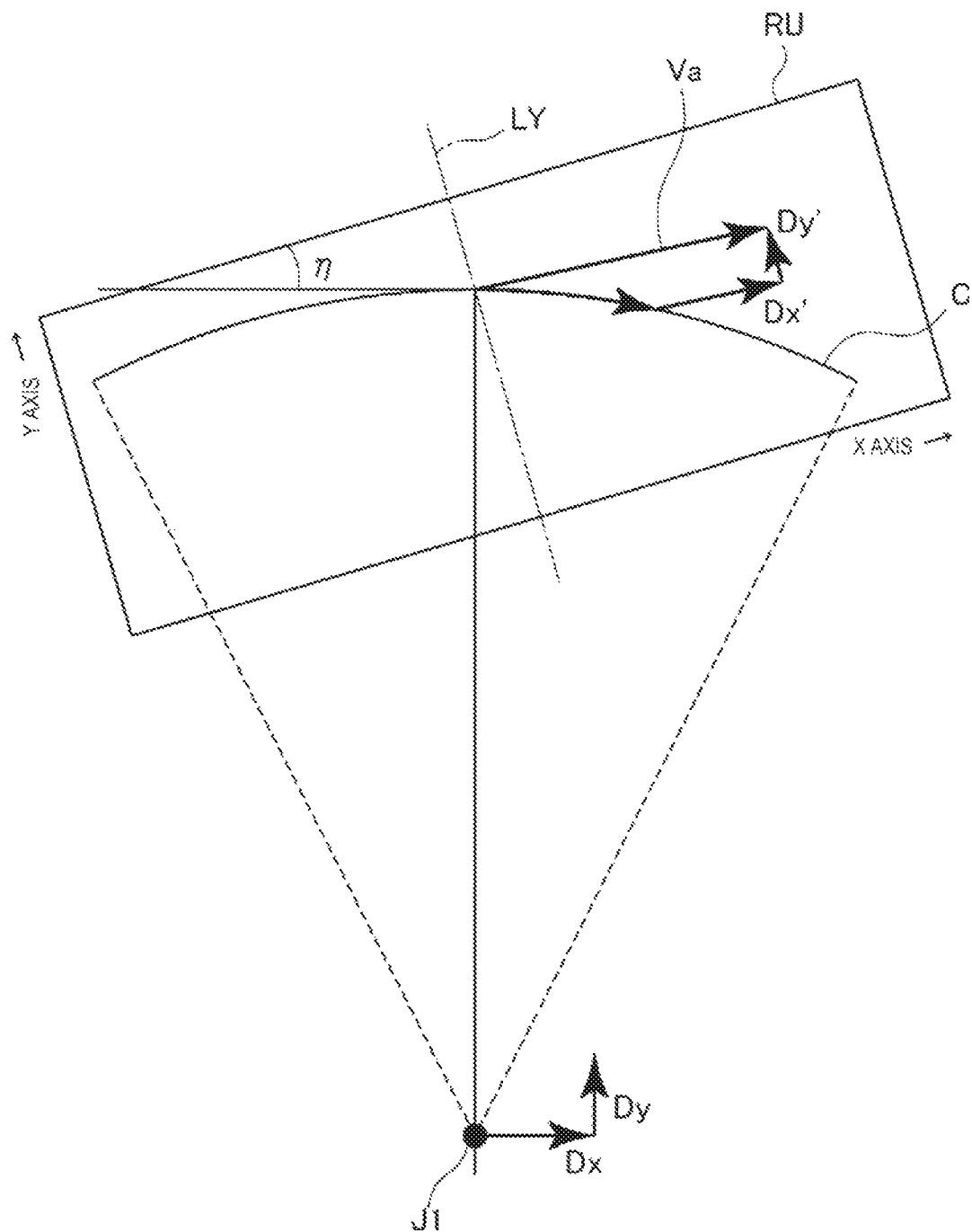
FIG. 21 is a schematic diagram illustrating a relationship between an effective visual field region and a movement locus of the scale portion in a second embodiment of the invention.
Figure 22:
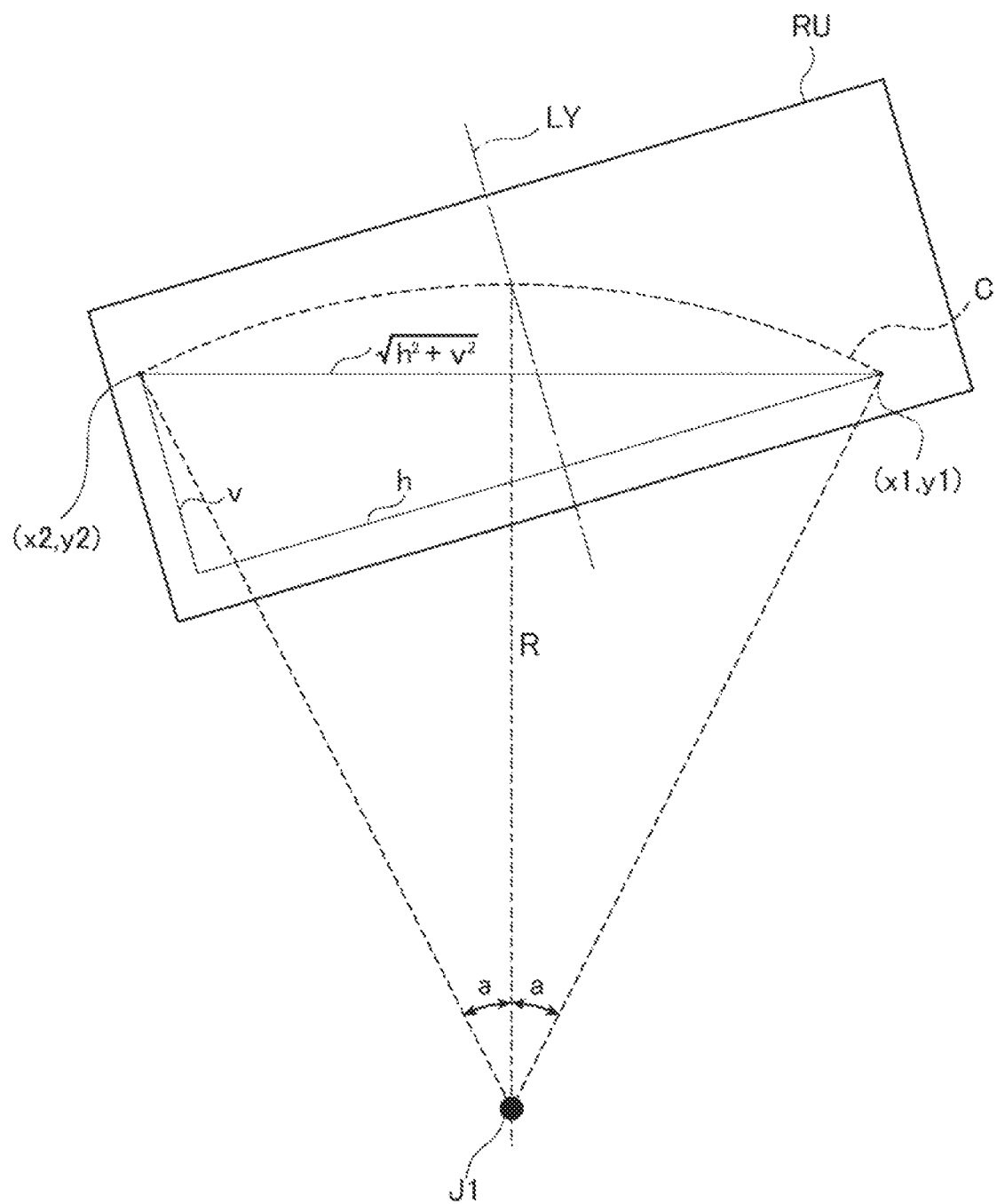
FIG. 22 is a diagram for illustrating a correction factor in the second embodiment of the invention.
Figure 23:
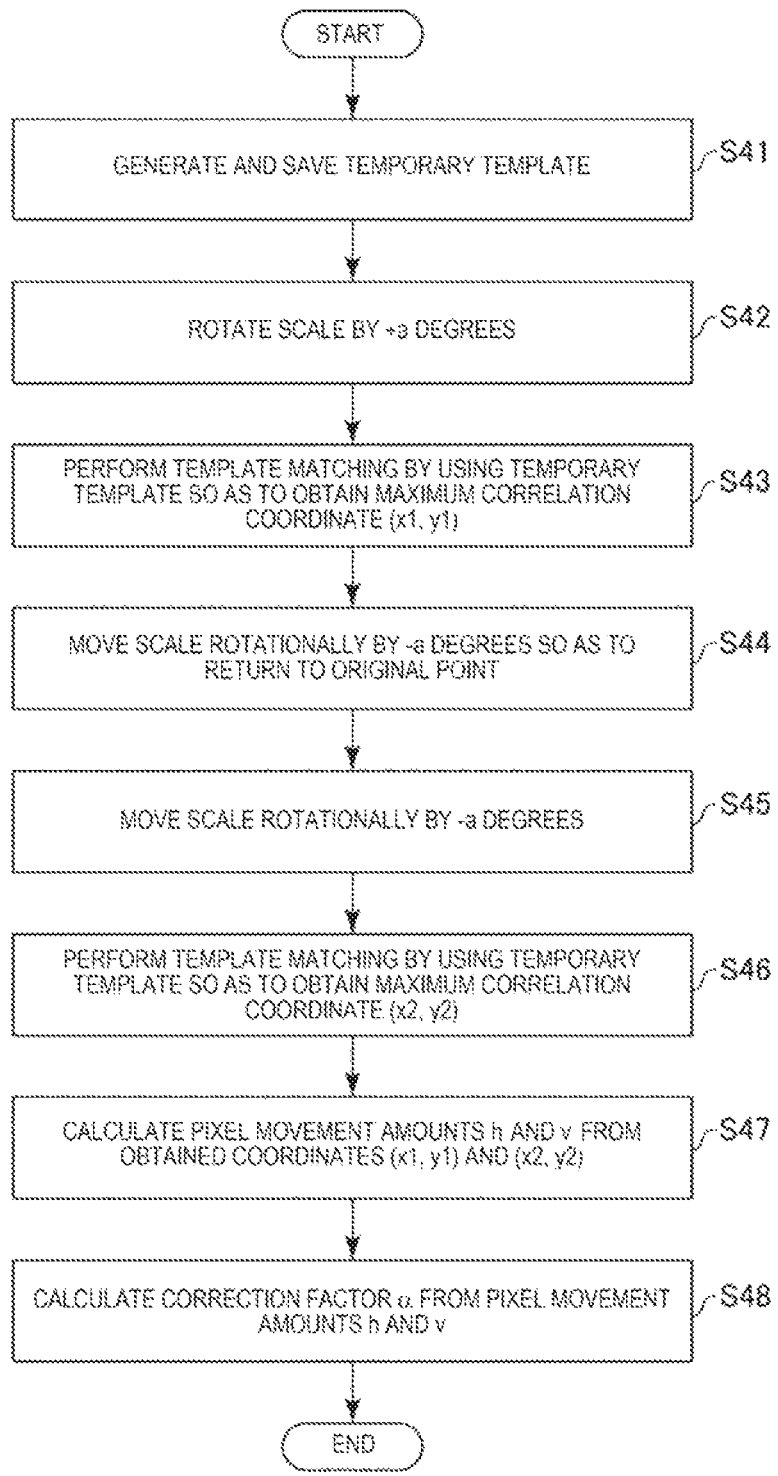
FIG. 23 is a flowchart illustrating a flow of obtaining the correction factor in the second embodiment of the invention.

FIG. 21 is a schematic diagram illustrating a relationship between an effective visual field region and a movement locus of the scale portion in a second embodiment of the invention. FIG. 22 is a diagram for illustrating a correction factor in the second embodiment of the invention. FIG. 23 is a flowchart illustrating a flow of obtaining the correction factor in the second embodiment of the invention.

Hereinafter, the second embodiment is described by focusing on differences from the embodiment described above, and the same description is omitted.

The embodiment is the same as the first embodiment described above except that the correction factor of an inclination of the imaging region is used when the rotation angle is calculated.

In the first embodiment described above, a case where the tangential line to the arc C at the intersection point between the center line LY and the arc C as the locus of the mark 21 is parallel to the X axis is described. However, an effort needs to be put for adjusting a posture of the effective visual field region RU with high accuracy. Hereinafter, a problem and a correction method of the problem of the case where the tangential line to the arc C at the intersection point between the center line LY and the arc C as the locus of the mark 21 is not parallel to the X axis are described.

When η represents an inclined angle of the X axis with respect to the tangential line of the arc C at the intersection point between the center line LY and the arc C as the locus of the mark 21, and (Dx', Dy') represents translation components that are observed by the first imaging element 31a and the second imaging element 31b when the first axis J1 is translated by the translation components (Dx, Dy), similarly to the description of the first embodiment above described, the following relationship is satisfied.

$$Dx = \sqrt{Dx^2 + Dy^2} \cos\left(\arctan\left(\frac{Dy}{Dx}\right) - \eta\right)$$

$$Dy = \sqrt{Dx^2 + Dy^2} \sin\left(\arctan\left(\frac{Dy}{Dx}\right) - \eta\right)$$

Expression (2)

As known from the expression, in a case where the inclined angle η is different in the first imaging element 31a and the second imaging element 31b from each other, it is not possible to make the translation vector to zero by only adding the movement vectors Va and Vb and dividing an added value by 2 unlike the above description of the first embodiment. Then, correction factor α of the inclined angle η of each of the first imaging element 31a and the second imaging element 31b is obtained in advance, and the correction factor α is used when the rotation angle θ is calculated. As illustrated in FIG. 22, when two coordinates on a line parallel to the tangential line to the arc C at the intersection point between the center line LY and the arc C as the locus of the mark 21 are (x1, y1) and (x2, y2), h=x1−x2, and v=y1−y2, the correction factor α satisfies a relationship of $\sqrt{(h^2+v^2)}/h$. Hereinafter, an example of a flow of obtaining the correction factor α will be described with reference to FIG. 23.

First, the center of the effective visual field region RU is the origin, an image having a pixel size, which is positioned at the origin, is generated and saved as a temporary template (Step S41). Next, the scale portion 2 is rotated normally by a predetermined angle a (for example, 1 degree) (Step S42), and then the template matching is performed by using the temporary template so as to obtain the maximum correlation coordinate (x1, y1) (Step S43). Next, the scale portion 2 is rotated reversely by the angle a (Step S44) and further rotated reversely by the angle z (Step S45), and then, similarly, the template matching is performed by using the temporary template so as to obtain the maximum correlation coordinate (x2, y2) (Step S46). The pixel movement amounts h and v are obtained from two obtained coordinates (x1, y1) and (x2, y2) (Step S47), and the correction factor α is obtained from the pixel movement amounts h and v (Step S48).

As described above, the correction factor α is obtained. The correction factor α is a factor for converting the coordinate system that is inclined by η into a coordinate system in which η=0. The correction factor α is multiplied to a movement amount Dx' observed on the coordinate system that is inclined by η, and thereby it is possible to obtain a real movement amount Dx on the coordinate system in which η=0. In other words, Dx=Dx'×α. Such conversion is performed for each of the first imaging element 31a and the second imaging element 31b, and thereby it is possible to consider η=0 in the effective visual field regions RU of both elements. After the conversion, similarly to the first embodiment described above, the rotation angle θ is obtained.

As described above, the first imaging element 31a has the plurality of pixels arranged in a matrix shape in directions along the X axis and the Y axis which are orthogonal to each other. The storage unit 6 stores angular deviation information which is information on an angular deviation from each of a direction (Y-axis direction), in which the first imaging element 31a and the second imaging element 31b are aligned, and the direction along the X axis. The processor 5 calculates the rotation angle of the first arm 120 by using the angular deviation information. Consequently, it is possible to enhance the measurement accuracy regardless of the posture of the first imaging element 31a. The same is true of the second imaging element 31b.

The angular deviation information is not particularly limited; however, in the embodiment, the processor 5 uses the correction factor α as the angular deviation information. Here, when any position of the scale portion 2 is moved from the first position (x1, y1) to a second position (x2, y2) different from the first position in the captured image G of the first imaging element 31a, h represents a distance between the first position and the second position in the direction along the X axis, v represents a distance between the first position and the second position in the direction along the Y axis, and α represents the correction factor, a relationship of $\alpha=\sqrt{(h^2+v^2)}/h$ is satisfied. Consequently, it is possible to easily acquire the correction factor α as the angular deviation information.

In addition, the angle measuring method of the embodiment further includes a step of obtaining the correction factor α and storing the correction factor in the storage unit 6 before the first movement amount and the second movement amount are obtained, in addition to the steps of the first embodiment described above. In the step of calculating and outputting the rotation angle θ, the rotation angle θ is calculated by using the correction factor α. Consequently, it is possible to enhance the measurement accuracy regardless of the posture of the first imaging element.

Also in the second embodiment described above, it is possible to achieve the same effects as those in the first embodiment described above.

Third Embodiment

Figure 24:
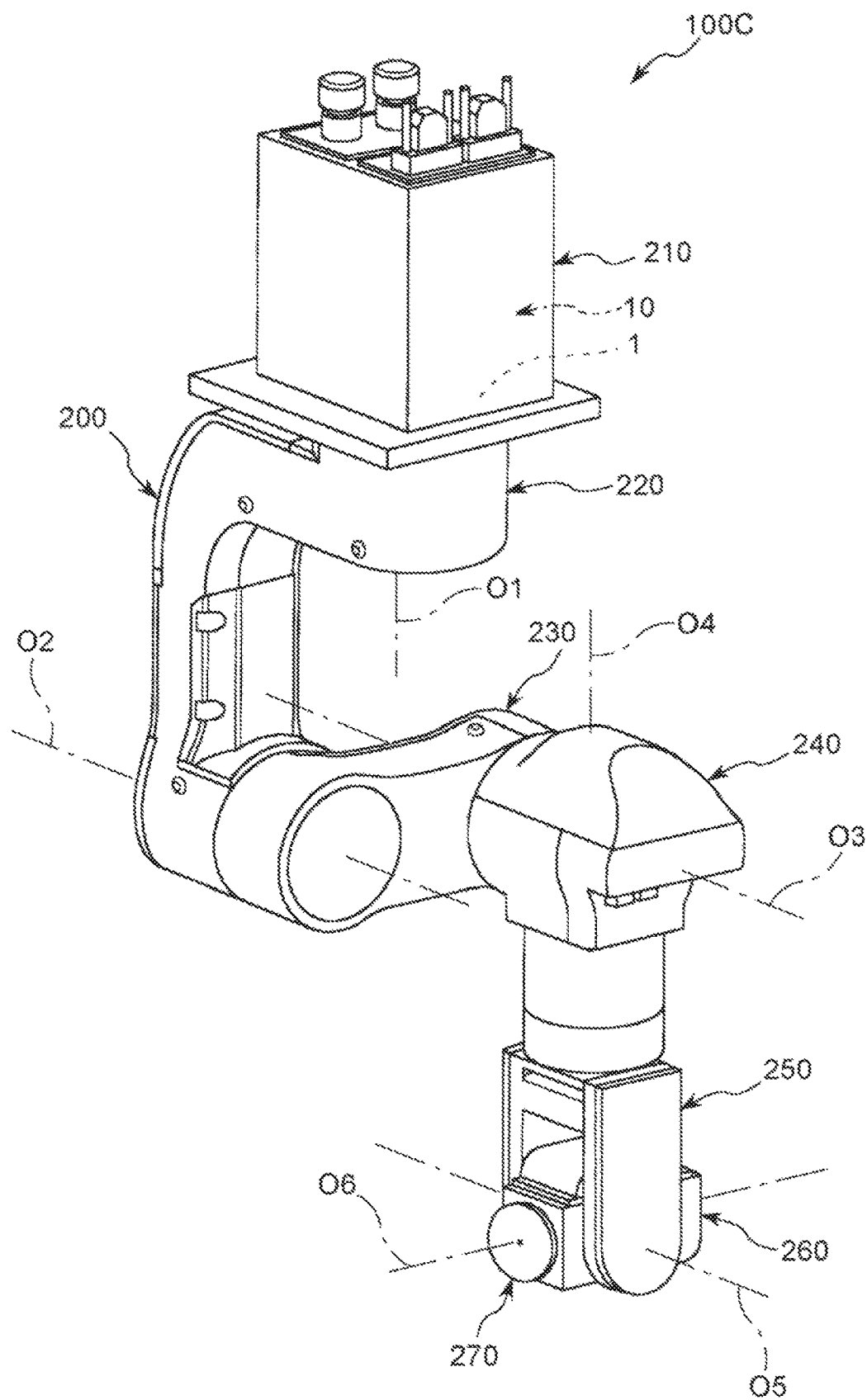
FIG. 24 is a perspective view illustrating a robot according to a third embodiment of the invention.

FIG. 24 is a perspective view illustrating a robot according to a third embodiment of the invention.

Hereinafter, a side of the base 210 of a robot 100C is referred to as a "proximal end side", and a side of the end effector is referred to as a "distal end side".

Hereinafter, the third embodiment is described by focusing on differences from the embodiments described above, and the same description is omitted.

The robot 100C illustrated in FIG. 24 is a vertical articulated (six-axis) robot. The robot 100C includes the base 210 and a robotic arm 200, and the robotic arm 200 includes a first arm 220, a second arm 230, a third arm 240, a fourth arm 250, a fifth arm 260, and a sixth arm 270. The arms are connected in this order from the proximal end side toward the distal end side. Although not illustrated, the end effector such as a hand, which grips is precision measuring equipment, a component, or the like, is detachably attached in a distal portion of the sixth arm 270. In addition, although not illustrated, the robot 100C includes a robot control device (control unit) such as a personal computer (PC) that controls motion of the members of the robot 100C.

Here, The base 210 is fixed to a floor, a wall, a ceiling, or the like, for example. The first arm 220 is rotationally movable around a first rotation axis O1 with respect to the base 210. The second arm 230 is rotatably movable around a second rotation axis O2 orthogonal to the first rotation axis O1, with respect to the first arm 220. The third arm 240 is rotatably movable around a third rotation axis O3 that is parallel to the second rotation axis O2, with respect to the second arm 230. The fourth arm 250 is rotatably movable around a fourth rotation axis O4 orthogonal to the third rotation axis O3, with respect to the third arm 240. The fifth arm 260 is rotatably movable around a fifth rotation axis O5 orthogonal to the fourth rotation axis O4, with respect to the fourth arm 250. The sixth arm 270 is rotatably movable around a sixth rotation axis O6 orthogonal to the fifth rotation axis O5, with respect to the fifth arm 260. In the first rotation axis to the sixth rotation axis O6, "to be orthogonal" includes a case where an angle formed between two axes is within a range from 90° to ±5°, and "to be parallel" includes a case where one of the two axes is inclined with respect to the other axis in a range of ±5°.

In addition, as a drive source the drives the first arm 220 with respect to the base 210, a motor (not illustrated) and the encoder unit 10 are provided. For example, the measurement result of the encoder 1 included in the encoder unit 10 is input to the robot control device (not illustrated) and is used for drive control of the drive source that rotates the first arm 220 with respect to the base 210. In addition, although not illustrated, a motor and an encoder unit are also provided in another joint unit, and it is possible to use the encoder unit 10 as the encoder unit.

As described above, the robot 100C includes the base 210, which is the first member, the first arm 220, which is the second member that moves rotationally with respect to the base 210, and the encoder unit 10. Here, the encoder unit 10 includes the speed reducer 112 that has the output shaft which rotates around the rotary shaft so as to output a drive force and the encoder 1 that measures the rotation angle of the output shaft of the speed reducer 112. The output shaft of the speed reducer 112 is connected to the first arm 220. According to the robot 100C, it is possible to measure the rotation angle of the first arm 220 with high accuracy and to perform drive control of the first arm 220 with high accuracy based on a detection result thereof.

In the above description, a case where the encoder detects the rotation state of the first arm 220 with respect to the base 210 is described; however, it is also possible to dispose another joint unit such that the encoder measures a rotation state of another arm. In this case, an arm on one side of the joint unit may be set as the first member, and the arm on the other side of the joint unit may be set as the second member.

As described above, the encoder unit, the angle measuring method, and the robot according to the invention are described on the basis of the preferred embodiments in the figures; however, the invention is not limited thereto, and it is possible to replace the configurations of the members with any configurations having the same functions. In addition, another configurational component may be attached. In addition, combinations of the two or more embodiments described above may be combined.

In addition, the encoder according to the invention can be applied to any type of absolute type and incremental type.

In addition, in the embodiments described above, a case where the base of the robot is a "base unit (first member), and the first arm is the "rotary unit (second member) is described as an example; however, the invention is not limited thereto, and one of any two members which relatively move rotationally can be the "base unit", and the other can be the "rotary unit". In other words, an installation position of the encoder is not limited to the joint unit between the base and the first arm and may be a joint unit between any two arms that relatively moves rotationally. In addition, the installation position of the encoder is not limited to the joint unit provided in the robot.

In addition, in the embodiments described above, the one robotic arm is provided; however, the number of the robotic arms is not limited to one, and two or more arms may be provided. In other words, the robot according to the invention may be a multi-arm robot such as a double-arm robot, for example.

In addition, in the embodiments described above, the robot arm has two or six arms; however, the number of arms is not limited thereto, and the robot may have one arm or may have three or more, five or more, or seven or more arms.

In addition, in the embodiments described above, an installation position of the robot according to the invention is not limited to the floor and may be a ceiling surface or a side wall surface or a moving object such as an automatic guided vehicle. In addition, the robot according to the invention is not limited to a robot that is fixed to be installed in a structure such as a building and may be a legged walking (mobile) robot having a leg unit, for example.

The entire disclosure of Japanese Patent Application No. 2018-025438, filed Feb. 15, 2018 is expressly incorporated by reference herein.

What is claimed is:
1. An encoder unit comprising:
a speed reducer having an output shaft that rotates around a rotary shaft so as to output a drive force; and
an encoder that measures a rotation angle of the output shaft,
wherein the encoder includes
a rotary unit that moves rotationally around the rotary shaft along with rotational movement of the output shaft,
a scale portion that is disposed on the rotary unit in a circumferential direction around the rotary shaft and has a first mark and a second mark,
a first imaging element that images the first mark,
a second imaging element that is disposed at a position symmetrical with the first imaging element with respect to the rotary shaft and images the second mark,
a processor that performs a process of obtaining a rotation angle of the rotary unit based on imaging results imaged by the first imaging element and the second imaging element, and
a storage unit that stores an instruction that is readable by the processor, and
wherein the processor reads the instruction from the storage unit such that
template matching with an image captured by the first imaging element is performed to obtain a first movement amount in the circumferential direction of the first mark,
template matching with an image captured by the second imaging element is performed to obtain a second movement amount in the circumferential direction of the second mark, and
a rotation angle is calculated and output by using the first movement amount and the second movement amount.
2. The encoder unit according to claim 1,
wherein the processor performs template matching by using a reference image in association with angle information, when obtaining the first movement amount.
3. A robot comprising:
a first member;
a second member that moves rotationally with respect to the first member; and
an encoder unit according to claim 2,
wherein the output shaft is connected to the second member.
4. The encoder unit according to claim 1,
wherein, when viewed in a direction along the rotary shaft, an angle between a straight line connecting the rotary shaft to the first imaging element and a straight line connecting the rotary shaft to the second imaging element is within a range from 174 degrees to 186 degrees.
5. A robot comprising:
a first member;
a second member that moves rotationally with respect to the first member; and
an encoder unit according to claim 4,
wherein the output shaft is connected to the second member.
6. The encoder unit according to claim 1,
wherein the first imaging element has a plurality of pixels arranged in a matrix shape in directions along an X axis and a Y axis which are orthogonal to each other,
wherein the storage unit stores angular deviation information which is information on an angular deviation from each of a direction, in which the first imaging element and the second imaging element are aligned, and the direction along the X axis, and wherein the processor calculates the rotation angle by using the angular deviation information.

7. The encoder unit according to claim 6, wherein the processor uses a correction factor as the angular deviation information, and wherein, when any position of the scale portion is moved from a first position to a second position different from the first position in a captured image of the first imaging element, h represents a distance between the first position and the second position in the direction along the X axis, v represents a distance between the first position and the second position in the direction along the Y axis, and a represents the correction factor, a relationship of $\alpha=\sqrt{(h^2+v^2)}/h$ is satisfied.

8. A robot comprising:

a first member;

a second member that moves rotationally with respect to the first member; and an encoder unit according to claim 7, wherein the output shaft is connected to the second member.

9. A robot comprising:

a first member;

a second member that moves rotationally with respect to the first member; and an encoder unit according to claim 6, wherein the output shaft is connected to the second member.

10. A robot comprising:

a first member;

a second member that moves rotationally with respect to the first member; and an encoder unit according to claim 1, wherein the output shaft is connected to the second member.

11. The robot according to claim 10, wherein the second member is an arm, and wherein the rotary unit is the arm.

12. An angle measuring method for measuring a rotation angle of an output shaft by using an encoder that includes a rotary unit that moves rotationally around a rotary shaft along with rotation of the output shaft of a speed reducer having the output shaft that rotates around the rotary shaft so as to output a drive force, a scale portion that is disposed on the rotary unit in a circumferential direction around the rotary shaft and has a first mark and a second mark, a first imaging element that images the first mark, and a second imaging element that is disposed at a position symmetrical with the first imaging element with respect to the rotary shaft and images the second mark, the method comprising:

performing template matching with an image captured by the first imaging element to obtain a first movement amount in the circumferential direction of the first mark;

performing template matching with an image captured by the second imaging element to obtain a second movement amount in the circumferential direction of the second mark; and calculating and outputting a rotation angle by using the first movement amount and the second movement amount.

13. The angle measuring method according to claim 12, further comprising:

obtaining a correction factor and storing the correction factor in a storage unit before the first movement amount and the second movement amount are obtained, wherein, in the calculating and outputting of the rotation angle, the rotation angle is calculated by using the correction factor.

* * * * *